United States Patent
Klingbeil et al.

(10) Patent No.: US 11,635,046 B1
(45) Date of Patent: Apr. 25, 2023

(54) METHOD AND SYSTEMS FOR ACTIVE AIR FUEL RATIO CONTROL

(71) Applicant: Transportation IP Holdings, LLC, Norwalk, CT (US)

(72) Inventors: Adam Edgar Klingbeil, Ballston Lake, NY (US); Thomas Michael Lavertu, Ballston Lake, NY (US); Eric Dillen, Edinboro, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/646,606

(22) Filed: Dec. 30, 2021

(51) Int. Cl.
*F02B 43/10* (2006.01)
*F02B 43/12* (2006.01)
*F02D 19/06* (2006.01)
*F02D 19/08* (2006.01)
*F02D 19/10* (2006.01)
*F02M 17/28* (2006.01)
*F02M 9/133* (2006.01)
*F02M 7/24* (2006.01)
*F02M 37/00* (2006.01)

(52) U.S. Cl.
CPC ............ *F02M 17/28* (2013.01); *F02M 7/245* (2013.01); *F02M 9/133* (2013.01); *F02M 37/00* (2013.01)

(58) Field of Classification Search
CPC .... F02B 43/10; F02B 43/12; F02B 2043/103; F02B 2043/106; F02D 19/0642; F02D 19/0644; F02D 19/08; F02D 19/081; F02D 19/10; F02D 41/0027
USPC .... 123/DIG. 12, 27 GE, 299, 304, 525, 526, 123/575, 577
See application file for complete search history.

(56) References Cited

U.S. PATENT DOCUMENTS

| | | | | |
|---|---|---|---|---|
| 8,151,779 | B1 * | 4/2012 | Hagiwara | ........... F02D 19/0665 123/575 |
| 8,206,470 | B1 * | 6/2012 | Jacobson | .............. F01N 3/2066 123/304 |
| 8,904,994 | B2 * | 12/2014 | Michikawauchi | .......................... F02M 21/0287 123/304 |
| 11,149,662 | B2 * | 10/2021 | Heggen | ............... F02D 19/0671 |
| 2006/0180121 | A1 * | 8/2006 | Wickman | ............ F02D 41/0025 123/304 |
| 2007/0137623 | A1 * | 6/2007 | Iwai | ........................ F02M 29/04 123/527 |

(Continued)

OTHER PUBLICATIONS

Lavertu, T. et al., "Methods and Systems for Multi-Fuel Engine," U.S. Appl. No. 17/644,554, filed Dec. 15, 2021, 44 pages.

*Primary Examiner* — Erick R Solis
(74) *Attorney, Agent, or Firm* — McCoy Russell LLP

(57) ABSTRACT

Various methods and systems are provided for controlling emissions and a likelihood of engine knock during combustion in a multi-fuel engine. A method for an engine includes mixing an amount of a first fuel and an amount of a second fuel to combust a fuel mixture having a fuel ratio of the first fuel relative to the second fuel, the first fuel having a faster combustion flame speed relative to the second fuel, the fuel mixture having an air-to-fuel ratio with an amount of air delivered to the engine. The method further includes controlling either or both of a speed of combustion and a stability of combustion of the fuel mixture with the amount of air delivered to the engine by changing at least one of the fuel ratio, the air-to-fuel ratio, or both of the fuel ratio and the air-to-fuel ratio.

20 Claims, 5 Drawing Sheets

(56) References Cited

U.S. PATENT DOCUMENTS

| | | | |
|---|---|---|---|
| 2008/0202449 A1* | 8/2008 | Shimada | F02B 43/04 |
| | | | 123/3 |
| 2010/0019506 A1* | 1/2010 | Gong | F01N 3/106 |
| | | | 290/1 A |
| 2010/0288211 A1* | 11/2010 | Agosta | F02D 19/0644 |
| | | | 123/3 |
| 2011/0259290 A1* | 10/2011 | Michikawauchi | F02D 19/0692 |
| | | | 123/1 A |
| 2014/0311428 A1* | 10/2014 | Miyagawa | F01N 3/106 |
| | | | 123/3 |
| 2018/0100450 A1* | 4/2018 | Sauve | F02D 19/0694 |
| 2019/0257253 A1* | 8/2019 | Klingbeil | F02D 19/0642 |
| 2019/0331034 A1* | 10/2019 | Nair | F02D 41/1498 |
| 2019/0345886 A1* | 11/2019 | Redder | F02D 19/105 |
| 2020/0003137 A1* | 1/2020 | Redder | F02D 19/081 |
| 2021/0040884 A1* | 2/2021 | Hoffmann | F02D 19/0655 |

* cited by examiner

METHOD AND SYSTEMS FOR ACTIVE AIR FUEL RATIO CONTROL

BACKGROUND

Technical Field

Embodiments of the subject matter disclosed herein relate to a multi-fuel engine system and a method for mitigating engine knock.

Discussion of Art

When operating in a multi-fuel mode, some engines (e.g. hydrogen/diesel multi-fuel engines) are prone to knock or fast combustion that may degrade the engine. This is primarily because the premixed fuel (e.g., hydrogen) burns faster than diesel and can auto ignite, causing knock or detonation. The flame speed and auto ignition characteristics may be mitigated in some cases by increasing the air-to-fuel ratio (AFR), thereby reducing the combustibility of the premixed fuel, and lessening the likelihood and severity of auto ignition.

Vehicles, such as rail vehicles and other off-highway vehicles, may utilize a multi-fuel engine system for propulsion. The multi-fuel engine system may allow vehicle navigation to be driven by torque produced through combustion of more than one type of fuel at the engine. Some fuels, while energy dense, may be prone to generating poor combustion conditions due to a high heat of vaporization, poor mixing, and/or low flame speed. In some embodiments, the more than one type of fuel may include hydrogen and diesel. Hydrogen may be delivered to the engine in a gaseous phase while diesel may be delivered in a liquid phase. Combustion parameters may vary according to a ratio of hydrogen to diesel injected at the engine due to different physical properties of the fuels. For example, hydrogen may have a higher gravimetric energy density, lower ignition energy, and wider range of flammability than diesel. As such, engine efficiency, power output, and emissions, e.g., carbon-based emissions and NOx, may be affected by co-combustion of hydrogen and diesel. In particular, engine performance may vary according to a substitution ratio (e.g., of hydrogen for diesel) of a fuel mixture injected at the engine. Combustion parameters may also vary according to a ratio of fuel to air within a combustion mixture. It may be desirable to have a system and a method that differs from those that are currently available. For example, a method for a multi-fuel engine may include active adjustment of the AFR and/or adjustment of the substitution ratio such that combustion of hydrogen and diesel may be stabilized. This may control a likelihood of engine knock and amount and character of certain emissions.

BRIEF DESCRIPTION

In one embodiment, a method for an engine includes mixing an amount of a first fuel with an amount of a second fuel to combust a fuel mixture having a fuel ratio of the first fuel relative to the second fuel, the first fuel having a faster combustion flame speed relative to the second fuel, the fuel mixture having an air-to-fuel ratio with an amount of air delivered to the engine, and controlling either or both of a speed of combustion and a stability of combustion of the fuel mixture with the amount of air delivered to the engine by changing at least one of the fuel ratio, the air-to-fuel ratio, or both of the fuel ratio and the air-to-fuel ratio.

DETAILED DESCRIPTION

Figure 1:
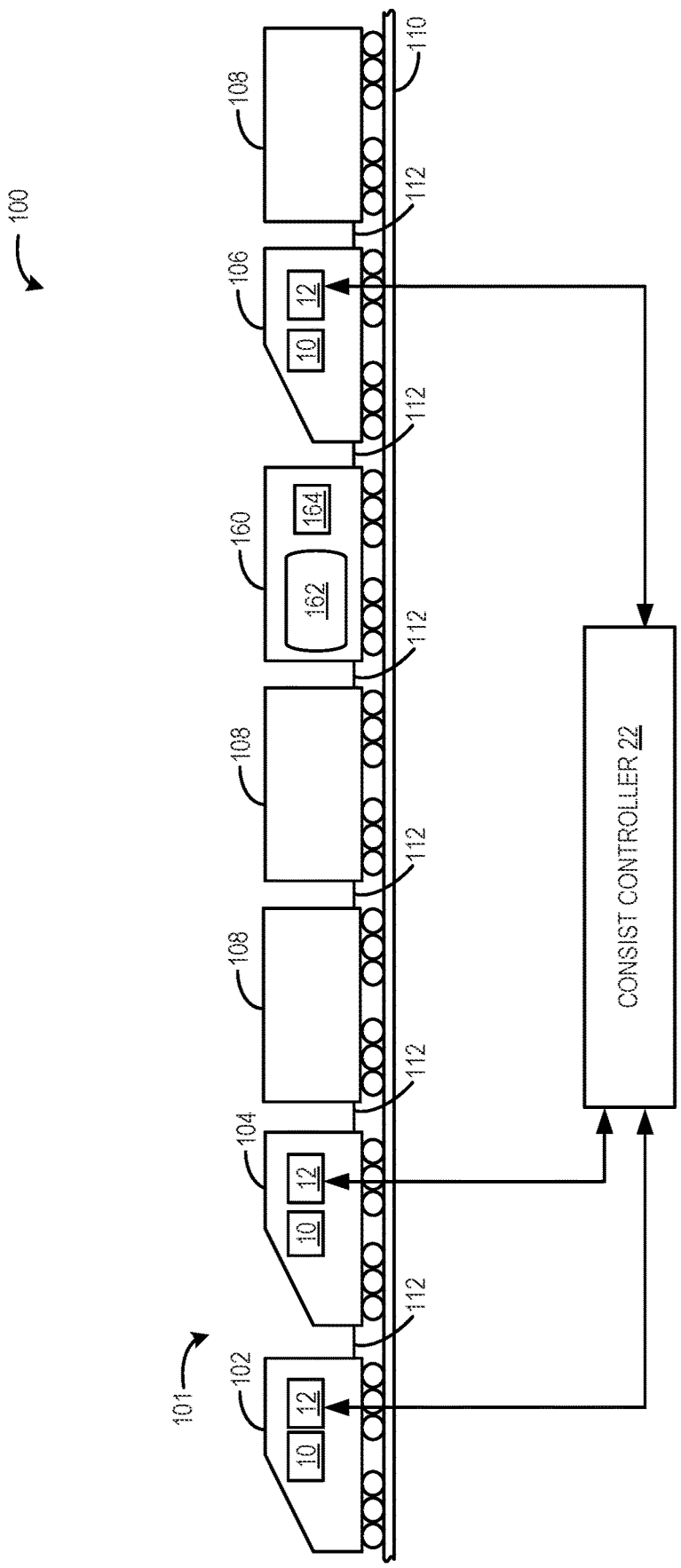
FIG. 1 shows an example embodiment of a train including a locomotive consist.

Embodiments disclosed in the following description and may relate to methods and systems for operating an internal combustion engine (ICE). The ICE may operate via combustion of a combination of different fuels as a mixture, and in different proportions relative to each other to form a substitution ratio of one fuel relative to a total amount of fuel consisting of at least two fuel types. The fuels may have different amounts of carbon, and suitable fuels may include one or more of gasoline, diesel, hydrogenation-derived renewable diesel (HDRD), alcohol(s), ethers, ammonia, biodiesels, hydrogen, natural gas, kerosene, syn-gas, and the like. The plurality of fuels may include gaseous fuels and liquid fuels, alone or in combination.

In one embodiment, systems and methods for a multi-fuel engine may include combusting a first fuel in combination with a second fuel. The multi-fuel engine may combust the second fuel alone, or as a fuel mixture with the first fuel. During some conditions, the multi-fuel engine may decrease an amount of second fuel used via substituting the first fuel into a combustion mixture. The first fuel may include a reduced carbon-content relative to the second fuel. Additionally or alternatively, the first fuel may be less expensive, more available, and/or more efficient. The second fuel may vary in ignitability and burn rate compared to the first fuel. Certain fuels may result in increased engine temperatures or undesired combustion conditions due to increased or decreased ignitability.

The substitution ratio of the second fuel of the ICE with the first fuel may be determined by a controller. The controller may determine the substitution ratio based at least in part on one or more of a current engine load, a current engine temperature, a current manifold temperature, a current injection timing, and a current air-to-fuel ratio. The controller may determine the substitution ratio based at least in part on the fuels used in the mixture, and their associated characteristics. The substitution ratio may be a ratio of the first fuel to a total amount of fuel (e.g., a sum of the first fuel and the second fuel). As the substitution ratio increases, the relative proportion of the first fuel increases relative to the total amount of fuel. In one example, the first fuel may be a fuel with a lower or zero carbon content relative to the second fuel. The substitution ratio may correspond to a percentage of total fuel energy content provided by each of the first fuel and the second fuel. For example, if the desired substitution ratio is 60%, then the first fuel may provide 60% of the total fuel energy content and the second fuel may provide 40% of the total fuel energy content.

In one embodiment, the ICE may combust fuel mixtures that include both diesel and hydrogen. During some operating modes, the ICE may combust only diesel, only hydrogen, or a combination thereof. When hydrogen is provided, operating conditions may be adjusted to account for the hydrogen and to promote enhanced combustion of the hydrogen. For example, adjusting operating conditions may include increasing an amount of air to be combusted with the fuel mixture of hydrogen and diesel such that airflow is increased, thus slowing a rate of combustion with hydrogen and allowing for a higher substitution ratio. Furthermore, increasing the substitution ratio may leverage a wide flammability range of hydrogen, e.g., relative to diesel, allowing engine performance to be increased under lean combustion. Further operating conditions may be adjusted such that hydrogen is combusted preferentially to diesel, where diesel combustion is reduced.

In another embodiment, ammonia may be provided in addition to or as an alternative fuel source for hydrogen. When ammonia is provided, operating conditions may be adjusted to account for the ammonia and to promote enhanced combustion of the ammonia. Adjustment of operating conditions to account for ammonia may be similar to or different from adjustments of operating conditions to account for hydrogen. For example, an air-to-fuel ratio (AFR) may be increased or decreased during adjustment of an ammonia to diesel ratio. Further details of AFR adjustment with regards to ammonia injection are beyond the scope of the present disclosure.

When the engine is operating in a diesel mode (e.g., only diesel is injected and burned), an AFR combusted at the engine may be selected to allow the diesel to fully combust, may decrease emissions, and may increase engine combustion efficiency. However, when operating in a multi-fuel mode (e.g., more than one fuel type is injected and burned), the AFR may be increased to reduce auto-ignition and knocking tendencies. The amount of AFR adjustment may depend on ambient conditions (e.g., temperature, pressure/altitude, humidity) and on engine power and/or torque. For example, an engine operation under higher ambient temperature and at higher power may lead to a higher likelihood of knock, therefore demanding a greater AFR adjustment relative to operation under lower ambient temperatures and at lower power, to mitigate a knock likelihood. As the multi-fuel mode operation inherently includes a substitution ratio (e.g., a quantity of hydrogen is being substituted for diesel) adjustment of the AFR may generate different combustion conditions. The substitution ratio, which may be affected by the AFR, may thus also be adjusted to decrease a likelihood of knock. For example, higher AFRs may enable higher substitution ratios. Therefore, a higher substitution ratio may be achieved by actively tuning the AFR.

Adjustments to engine operating conditions that allow for increased substitution ratio, such as increasing the AFR, may benefit the dual fuel engine. For example, combustion conditions which may be established by increasing the AFR may result in an increase in power output and a decrease in emissions. The embodiments described herein detail substitution ratio adjustments where hydrogen is substituted for diesel. Other embodiments may include substitution ratios including natural gas, alcohol and ammonia, as well as other type of fuels. Certain fuels (e.g., ammonia) may rely on different adjustments (e.g., increase or decrease in AFR) to increase an amount of fuel vaporization and combustion.

Embodiments of the system described herein may include a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms may include self-propelled vehicles. Such vehicles can include on-road transportation vehicles, and other off-highway vehicles (OHV). Suitable on-road vehicles can include automobiles, buses, and semi-trucks. Suitable off road vehicles can include mining equipment, marine vessels, rail vehicles, agricultural vehicles, and the like. For clarity of illustration, a rail vehicle such as a locomotive is used as an example of a mobile platform. Suitable systems may include an engine, a turbocharger, a fuel system, and a controller or control system. Some embodiments may include an aftertreatment system or other emission reduction system. The vehicles can operate singly or may move as a group. A vehicle group may be coupled together mechanically (as in a consist) and/or virtually (as in a platoon or swarm) to coordinate their movements.

Before further discussion of the methods for reducing a likelihood of engine knock due to fuel auto-ignition by actively adjusting the AFR, an example platform in which the methods may be implemented is shown. Actively adjusting the AFR includes selectively modifying the AFR to achieve a desired fuel substitution ratio, rather than adjusting the substitution ratio according to a set AFR corresponding to engine operation conditions. FIG. 1 depicts an example train 100, including a plurality of rail vehicles 102, 104, 106, a fuel tender 160, and cars 108, that can run on a track 110. The plurality of rail vehicles, the fuel tender, and the cars are coupled to each other through couplers 112. In one embodiment, the plurality of rail vehicles may be locomotives, including a lead locomotive and one or more remote locomotives. The locomotives in the train may form a consist. For example, in the embodiment depicted, the locomotives may form a consist 101. As illustrated, the train includes one consist. Various vehicles may form vehicle groups (such as consists, convoys, swarms, fleets, platoons, and the like). The vehicles in a group may be coupled together mechanically and/or virtually. Throttle and braking commands may be relayed from the lead locomotive to the remote locomotives by a radio link or physical cable, for example.

The locomotives may be powered by an engine 10, while the cars may be un-powered. In the illustrated embodiment, the engine is a multi-fuel engine and may combust gaseous and/or liquid fuels or fuels with differing amounts of carbon, and do so in varying ratios of one fuel to another (e.g., the substitution ratio). In some embodiments, the multi-fuel engine may be specifically a dual-fuel engine to combust two fuels, either of which may be a gaseous or liquid fuel that is hydrocarbon or non-hydrocarbon based. In other embodiments, the engine may be a single fuel engine that can combust a gaseous or a liquid fuel.

The train may include a control system. The control system may include an engine controller 12, and it may also include a consist controller 22. As depicted in FIG. 1, each locomotive includes an engine controller. The engine controller may be in communication with the consist controller. The consist controller may be located on one vehicle of the train, such as the lead locomotive, or may be remotely located, for example, at a dispatch center. The consist controller may receive information from, and transmit signals to, each of the locomotives of the consist. For example, the consist controller may receive signals from a variety of sensors on the train and adjust train operations accordingly.

The consist controller may be coupled to each engine controller for adjusting engine operations of each locomotive.

Figure 4:
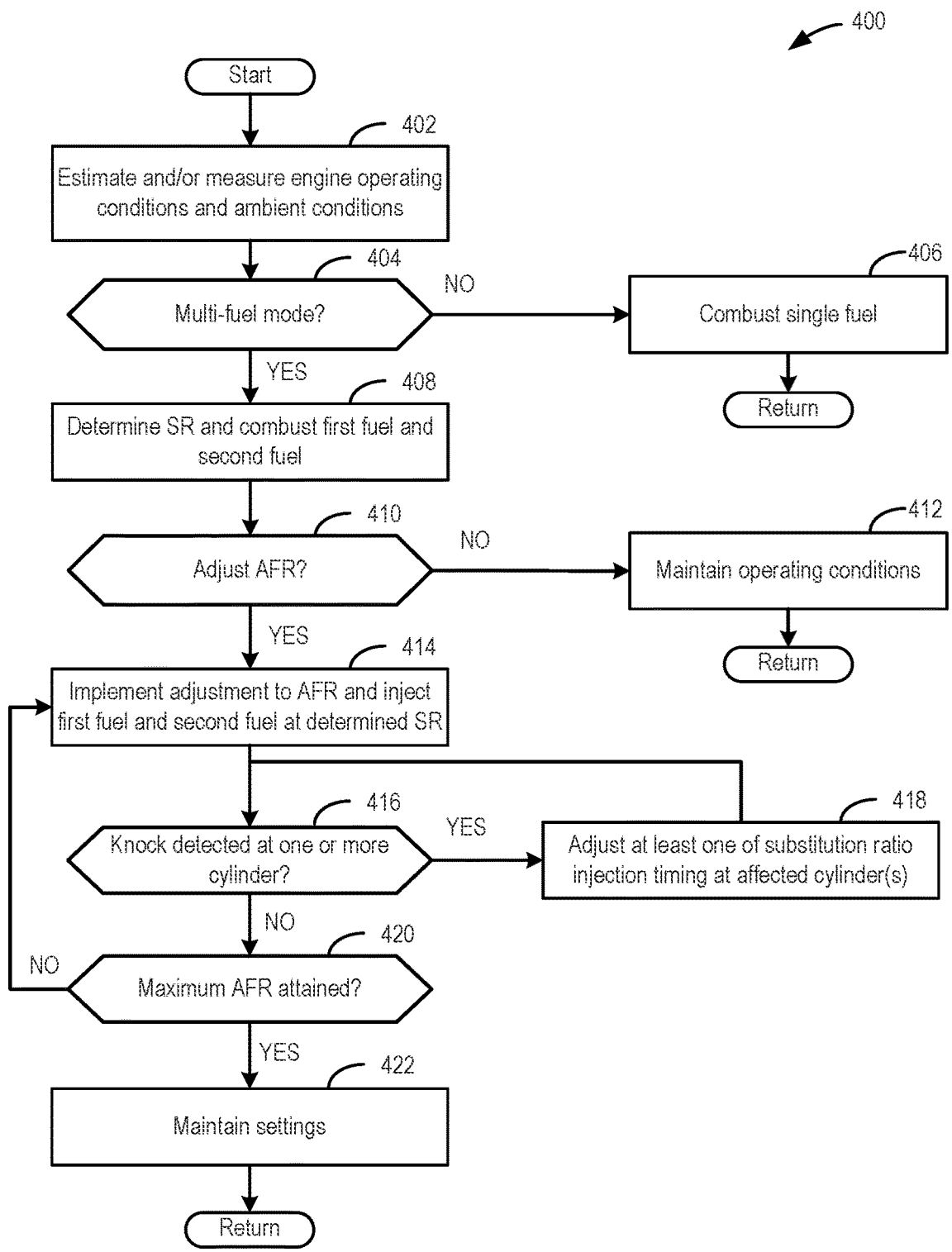
FIG. 4 shows an example method for adjusting an air-to-fuel ratio (AFR) of the multi-fuel engine.
Figure 5:
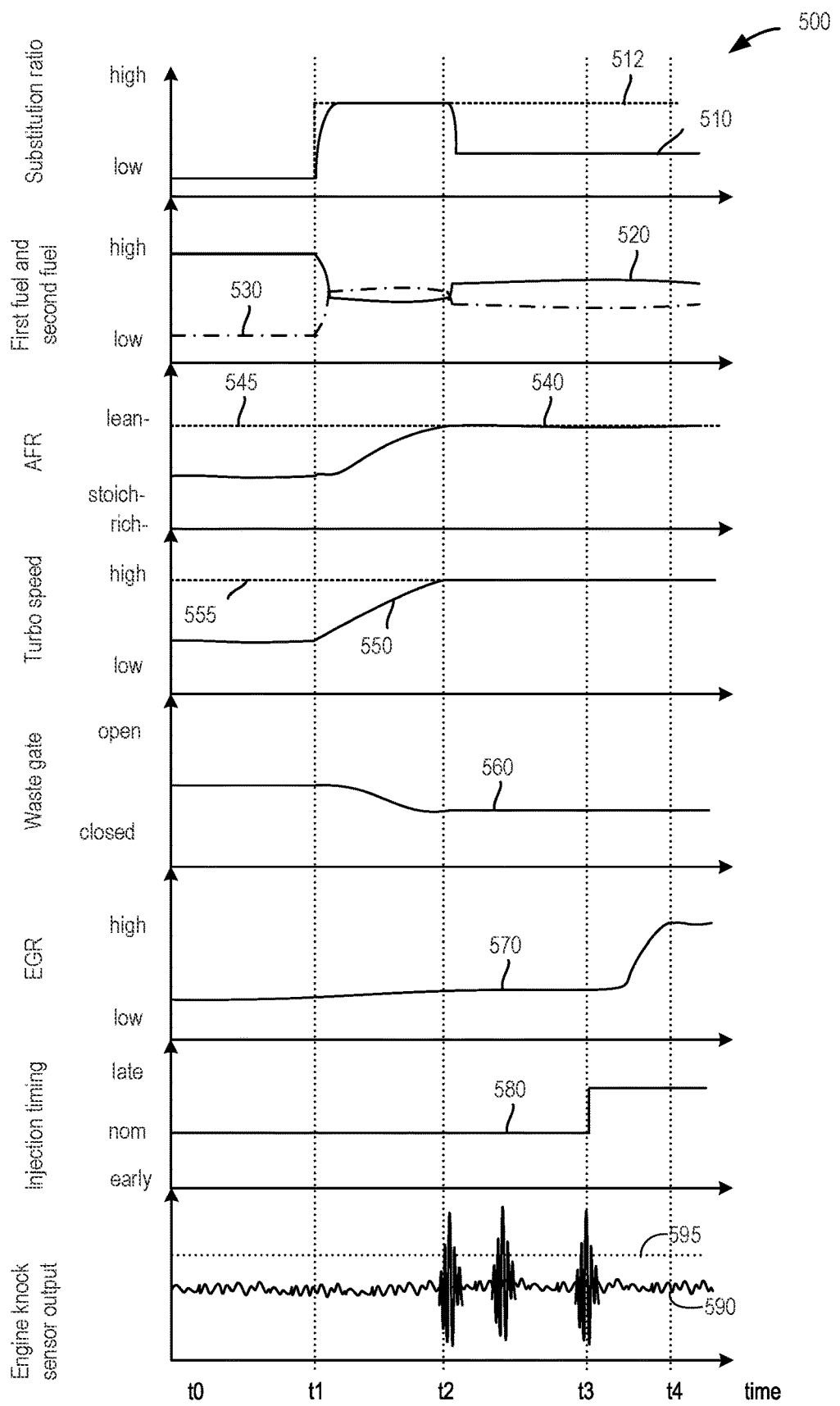
FIG. 5 shows a timeline illustrating adjustments to operating parameters of the multi-fuel engine to adjust the AFR.

As elaborated with reference to FIGS. 4-5, each engine controller may determine a current engine condition and adjust an AFR thereof. Settings for at least one of exhaust gas recirculation (EGR), waste gate position, injection timing, and substitution ratio may be adjusted to adjust the AFR. The aforementioned settings may be adjusted based on one or more of barometric pressure, ambient temperature, humidity, engine speed, engine power, manifold air temperature, and manifold air pressure. As described above, the substitution ratio corresponds to a substitution of a second fuel with a first fuel. The engine may combust the second fuel alone in one operating mode. However, in other operating modes the engine may perform multi-fuel combustion. The switch of operating modes may be done, for example, to decrease one or more emission types, decrease combustion costs, increase engine efficiency, accommodate a low availability of one or more fuels, and the like. The first fuel and the second fuels may be selected from gasoline, diesel, alcohol(s), ethers, ammonia, hydrogen, natural gas, kerosene, syn-gas, and the like. Suitable diesel fuel may include regular diesel, hydrogenation-derived renewable diesel (HDRD), and biodiesel. In one embodiment, the propulsion system may be augmented with a fuel cell and/or an energy storage device that accepts and/or provides electrical energy to traction motors. In the herein described embodiment, the second fuel is diesel and the first fuel is hydrogen.

The train may include at least one fuel tender, which may carry one or more fuel storage tanks 162 and includes a controller 164. While the fuel tender may be positioned in front of the remote locomotive 106, in other examples it may be in other locations along the train.

Figure 2:
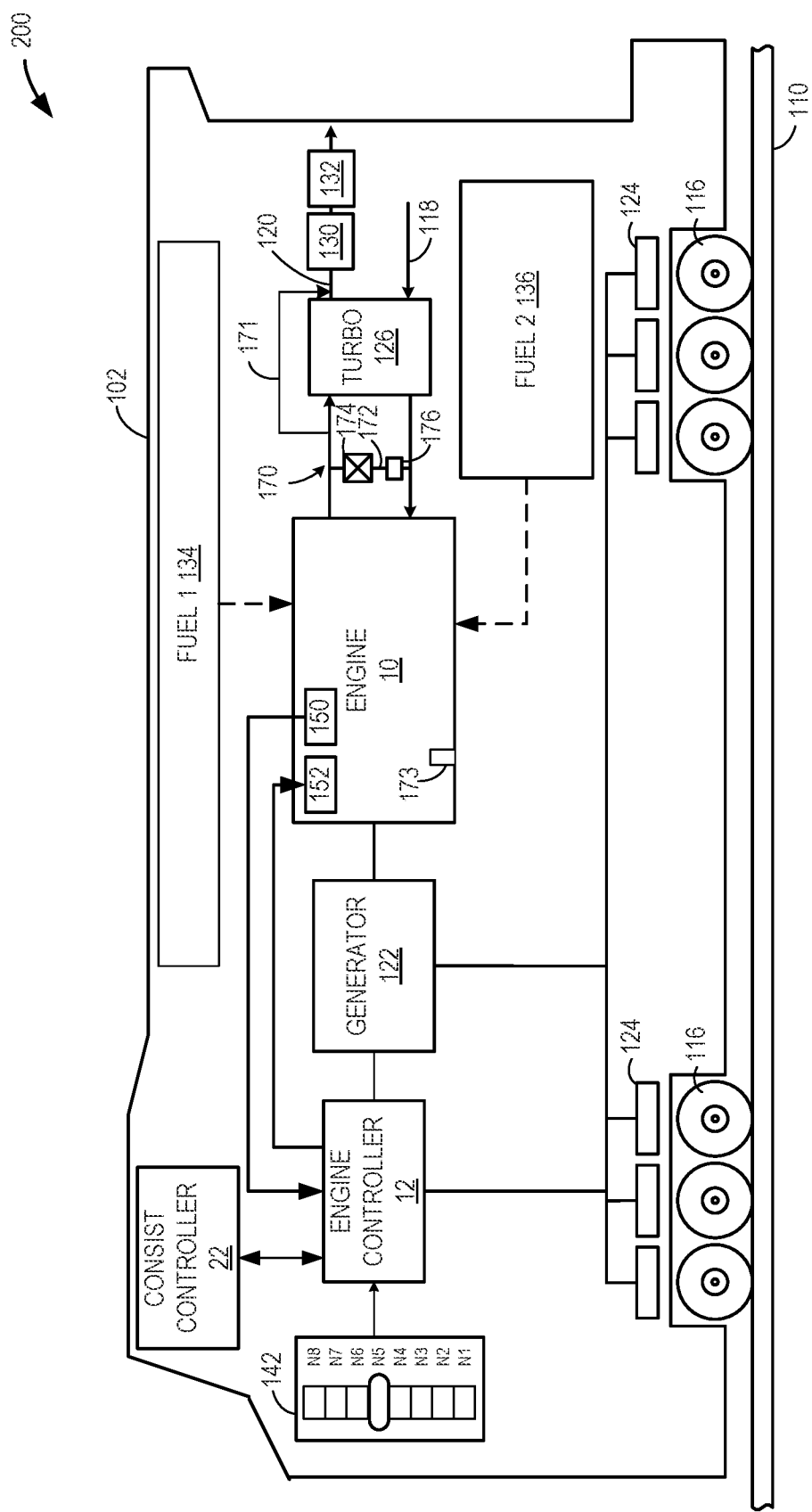
FIG. 2 shows a schematic diagram of an example embodiment of a locomotive from FIG. 1, the locomotive having a multi-fuel engine.
Figure 3:
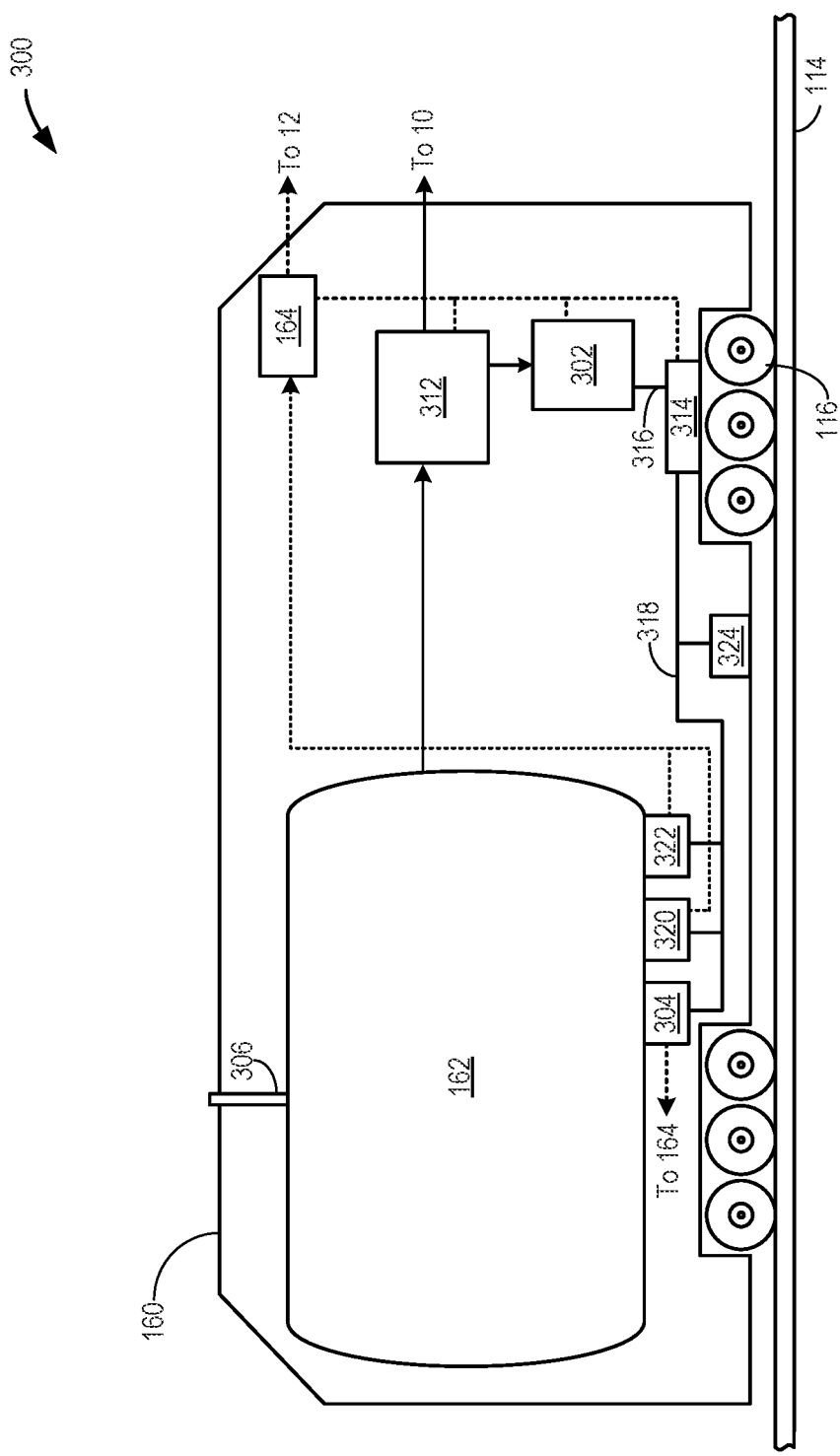
FIG. 3 shows an example embodiment of a fuel tender which may be included in the train of FIG. 1.

In one embodiment, the fuel tender may be un-powered, e.g., without an engine or electric traction motors (e.g., electric traction motors 124 shown in FIG. 2). However, in other embodiments, the fuel tender may be powered for propulsion. For example, as shown in FIG. 3, the fuel tender may include an engine 302. The engine of the fuel tender may combust the fuel stored in the fuel storage tank and/or fuel stored at another vehicle of the train.

The one or more fuel storage tanks of the fuel tender may have a structure suitable for storing a specific type of fuel. In one embodiment, the fuel storage tank may be adapted for cryogenic storage of liquefied natural gas (LNG). As another embodiment, the fuel storage tank may store a fuel in a liquid state at ambient temperature and pressure, such as diesel or ammonia. In yet another embodiment, the fuel storage tank may store a fuel as a compressed gas, such as hydrogen or natural gas. In each instance, the fuel tender may be equipped with various mechanisms and devices for storage of the particular fuel. Further details of the fuel tender are shown further below, with reference to FIG. 3.

In some examples, fuel may be stored only at the fuel tender. In other examples, however, fuel may be stored both at the fuel tender and at one or more of the locomotives, e.g., as shown in FIG. 2. In addition, in some instances the fuel tender may have a fuel cell system. The fuel cell system may include a fuel cell and one or more tanks of hydrogen.

FIG. 2 depicts an example embodiment 200 of a locomotive as part of a train that can run on a track 114 via a plurality of wheels 116. Power for propulsion of the locomotive may be supplied at least in part by the engine. The engine receives intake air for combustion from an intake passage 118. The intake passage receives ambient air from an air filter (not shown) that filters air from outside of the locomotive. Exhaust gas resulting from combustion in the engine is supplied to an exhaust passage 120. Exhaust gas flows through the exhaust passage, and out of an exhaust stack (not shown) of the locomotive.

In one embodiment, the engine operates as a compression ignition engine which may combust at least one type of fuel. The compression ignition engine may further combust fuel according to a variety of methods. More specifically, the compression ignition engine may leverage combustion strategies for decreasing combustion temperature, which may enable NOx and particulate matter emissions to be decreased. For example, when the AFR is greater than a first air-to-fuel threshold and a substitution ratio is greater than a first substitution threshold, the engine may burn fuel via homogeneous charge compression ignition (HCCI), where a well-mixed fuel and an oxidizer (e.g., air) may be compressed to auto-ignite. As such, lean mixtures may be combusted, further suppressing NOx formation. As another example, and the multi-fuel engine may burn fuel via premixed charge compression ignition (PCCI) when the AFR is less than a second air-to-fuel threshold and the substitution ratio is less than a second substitution threshold. The first air-fuel threshold may be greater than the second air-fuel threshold (e.g., an amount of air at the first air-fuel threshold is greater than an amount of air at the second AFR). The first substitution threshold is greater than the second substitution threshold (e.g., an amount of first fuel at the first substitution threshold is greater than an amount of fuel at the second substitution threshold). Combustion using PCCI may be similar to combustion with HCCI, but may have an increased engine operating range, propensity for knock, and control over combustion parameters. When utilizing PCCI for combustion, a fuel/air mixture may be not entirely homogeneous. This may allow the fuel to be injected through advanced direct injection, late direction injection and port injection. As a result, fuel injection may be completed before combustion begins, thereby decreasing particulate matter while allowing exhaust gas recirculation (EGR) flow to decrease NOx emissions.

In another embodiment, the engine operates as a spark ignition engine. The engine, as either the compression ignition engine or the spark ignition engine, may combust one specific fuel type only or may be able to combust two or more types of fuel, e.g., a multi-fuel engine. As such, the different fuel types may be combusted individually or co-combusted, e.g., combusted concurrently, at the engine. In one embodiment, the multi-fuel engine may be a dual fuel engine. As depicted in FIG. 2, the dual fuel engine may receive a first fuel from a first fuel reservoir 134 and a second fuel from a second fuel reservoir 136.

While the locomotive is equipped with two fuel reservoirs in FIG. 2, in other embodiments, the locomotive may include only one fuel reservoir or no fuel reservoir. For example, at least one of the fuel reservoirs may be stored at the fuel tender, e.g., the fuel tender of FIG. 1. Alternatively, at least one additional fuel, e.g., a third fuel, may be stored at the fuel tender in addition to the first fuel at the first fuel reservoir and the second fuel at the second fuel reservoir of the locomotive. In one embodiment, fuels which may be stored at ambient pressure and temperature without any additional equipment or specialized storage tank configurations may be stored at the locomotive. Fuels demanding specialized equipment, such as for cryogenic or high pressure storage, may be stored on-board the fuel tender. In other embodiments, however, the locomotive and the fuel tender may each store fuels that do not demand specialized equipment.

The first and second fuels (e.g., any fuels stored on-board the train) may each be any of a number of different fuel types. For example, the types of fuel may include hydrocarbon-based fuels, such as diesel, natural gas, methanol, ethanol, dimethyl ether (DME), and so on. Alternatively, the fuels may be non-hydrocarbon-based fuels, such as hydrogen, ammonia, and so on. The fuels listed above are non-limiting examples of fuels which may be combusted at the engine and various other types of fuels are possible.

Additionally, each of the stored fuels may be a gaseous or a liquid phase fuel. Thus, when a compression ignition engine is combusting a single fuel type, the engine may consume a gaseous fuel or a liquid fuel. When the compression ignition engine is a multi-fuel engine, the engine may combust only liquid fuels, only gaseous fuels, or a combination of liquid and gaseous fuels. Similarly, when a spark ignition engine combusts a single fuel type, the engine may also consume either a gaseous fuel or a liquid fuel. A multi-fuel spark ignition engine may combust only liquid fuels, only gaseous fuels, or a combination of liquid and gaseous fuels.

As either of the spark ignition or the compression ignition multi-fuel engine configurations, the engine may combust fuel combinations in different manners. For example, one fuel type may be a first combustion fuel and another fuel type may be a second, additive fuel used under certain conditions to adjust combustion characteristics. For example, during engine startup, a fuel combustion mixture may include a smaller proportion of diesel to seed ignition while hydrogen may form a larger proportion of the mixture. In other embodiments, one fuel may be used for pilot injection prior to injection of the first combustion fuel. In some embodiments, the substitution ratio may be set based on one or more conditions to increase an amount of carbon-free fuel to decrease carbon emissions. A ratio of carbon-free fuel used may be adjusted based on desired ignition timing, where the desired ignition timing is based on one or more of an engine load, an intake manifold temperature and pressure, and an ignitability of the fuel mixture, as further described herein.

The engine, as the multi-fuel engine, may combust various combinations of the fuels and the fuels may be premixed or not premixed prior to combustion. In one example, the first fuel and the second fuel may be individually introduced to the cylinder, which may contain air to be combusted with the fuel. Each of the first fuel and the second fuel may mix with air at a different rate. For example, the first fuel may mix with air more than with the second fuel. Thus, in one example, mixing an amount of the first fuel and an amount of the second fuel to combust a fuel mixture having a determined fuel ratio of the first fuel relative to the second fuel may include mixing the first fuel and the second fuel in the cylinder.

In one embodiment, the first fuel may be hydrogen and the second fuel may be diesel. In another embodiment, the first fuel may be ammonia and the second fuel may be diesel. Further combinations are possible with storage of a third fuel on the fuel tender. For example, LNG may be stored at the fuel tender and the engine may combust LNG and hydrogen, or LNG, diesel, and hydrogen, or LNG, ammonia, and hydrogen. As such, numerous combinations of fuel types are possible, where the combinations may be determined based on compatibility of the fuels. A method of delivery of the fuels to the engine for combustion may similarly depend on properties of the fuel type.

When the engine is the single fuel-combusting engine (either spark ignition or compression ignition), the engine may consume a single liquid phase fuel. For example, the engine may combust diesel, hydrogen, ammonia, LNG, or another liquid phase fuel. Similarly, the engine may combust a single gaseous fuel, such as hydrogen, or another gaseous fuel.

A fuel that is stored on-board in one physical state, e.g., gas or liquid, may be delivered to the engine in the same state or a different state. For example, LNG may be stored cryogenically in the liquid phase but may undergo a transition to the gas phase, e.g., at a regasification unit in the fuel tender, prior to injection at the engine. Other fuels, however, may be stored as a liquid and injected as a liquid or stored as a gas and injected as a gas.

Fuels may be injected at the engine according to more than one injection technique, for example. In one embodiment, one or more of the fuels may be delivered to the engine cylinders via an indirect injection method, such as port injection. In another embodiment, at least one of the fuels may be introduced to the engine cylinders via direct injection. In yet another embodiment, at least one of the fuels may be injected by central manifold injection. The engine may receive the fuels exclusively by indirect injection, exclusively by direct injection, or by a combination of indirect and direct injection. As one example, the fuels may be injected via port injection during low loads and by direct injection during high loads. In particular, when one of the fuels is a gaseous fuel, premixing of the gaseous fuel may be desirable via port injection. The fuels may also be premixed when introduced by central manifold injection. Premixing by direct injection is possible, such as by injection of the gaseous fuel during an intake stroke of the engine cylinders. Additionally or alternatively, a location of injection of one or more fuels may be based on a combustibility of a fuel. For example, ammonia may be injected indirectly and premixed with charged air and/or EGR to enhance the combustibility and vaporization thereof. In another example, as described above, the first fuel and the second fuel may be independently injected into the cylinder and thus independently mix with air in the cylinder and with the other injected fuel (e.g., the first fuel or the second fuel).

During operation, each cylinder within the engine may use a four stroke cycle via actuation of the piston along an axis. The cycle includes the intake stroke, compression stroke, expansion stroke, and exhaust stroke. During the intake stroke, the exhaust valve may close and the intake valve may open. Air is introduced into the combustion chamber via the intake manifold, and the piston moves to the bottom of the cylinder so as to increase the volume within the combustion chamber. The position at which the piston is near the bottom of the cylinder and at the end of its stroke (e.g. when the combustion chamber is at its largest volume) is referred to by those of skill in the art as bottom dead center (BDC). During the compression stroke, the intake valve and the exhaust valve are closed. The piston moves toward the cylinder head so as to compress the air within the combustion chamber. The point at which piston is at the end of its stroke and closest to the cylinder head (e.g. when the combustion chamber is at its smallest volume) is referred to by those of skill in the art as top dead center (TDC). In a process hereinafter referred to as direct injection, fuel is introduced into the combustion chamber. In some embodiments, fuel may be injected to the cylinder a plurality of times during a single cylinder cycle. In a process hereinafter referred to as ignition, the injected fuel is ignited by compression ignition resulting in combustion. During the expansion stroke, the expanding gases push the piston back to BDC. The crankshaft converts piston movement into a rotational torque of the rotary shaft. Finally, during the exhaust stroke, the exhaust valve opens to release the combusted air-fuel mixture to the exhaust manifold and the piston returns to TDC. Note that the above is described merely as an example, and that injection timing may vary, such as to advance or delay injection timing to decrease emissions. For example, injection timing may be based on a position of the piston during the engine cycle and may be desired near TDC of the compression stroke. A more advanced injection timing may include where the injection timing is moved prior to TDC of the compression stroke and a delayed injection timing may include where the injection timing is moved after TDC of the compression stroke. In some embodiments, nominal injection timing may occur after TDC of the compression stroke (e.g., at the start of the expansion stroke) and delayed injection timing may occur as the piston approaches BDC during the expansion stroke. Further, in some examples, a two-stroke cycle may be used rather than a four-stroke cycle.

Each type of injection may include injection of either gaseous or liquid phase fuels. However, some injection methods may be more suitable for certain fuels depending on specific properties of the fuel type. For example, hydrogen may be injected by port injection or direct injection. Liquid phase fuels, such as diesel, may be injected by direct injection. Ammonia and natural gas may each be selectively injected by port injection or direct injection. Similarly, fuels such as methanol and ethanol may be either port injected or direct injected. In some instances, the engine may have fuel injectors capable of switching between injection of gaseous fuels and of liquid fuels.

The fuels combusted by the dual fuel engine, whether in the gas phase or liquid phase, may or may not be premixed prior to combustion according to the type of fuel. For example, depending on operating conditions, premixing of hydrogen, natural gas, ammonia, methanol, ethanol, and DME may be desirable. During other operating conditions, fuels such as diesel, hydrogen, natural gas, methanol, and ethanol may not be premixed. Premixing of the fuels may include port injection of at least one of the fuels into an inlet manifold or inlet port where the fuel may mix with air before entering a cylinder. As another example, each of the fuels may be port injected, allowing the fuels to mix with one another and with air prior to combustion. In other embodiments, the fuel(s) may be injected into a pre-combustion chamber fluidically coupled to a cylinder head where each of the first fuel and the second fuel may independently mix with air and with each other in the pre-combustion chamber before flowing to the cylinder head. Further, the first fuel and the second fuel may be independently injected into the cylinder head and independently mix with air and with each other.

A substitution ratio of the fuels for co-combustion may vary according to operating conditions. For example, when the first fuel is hydrogen and the second fuel is diesel, a hydrogen-diesel ratio may be decreased in response to an increase in power demand at the engine. In some instances, the ratio may be adjusted such that only one of the fuels is combusted at the engine. The substitution ratio may vary according to the AFR such that, when the AFR is adjusted via adjustment of operating parameters, the substitution ratio may be increased to a maximum substitution ratio (e.g., a maximum amount of hydrogen combusted with diesel). In one embodiment, the maximum substitution ratio may be an amount of hydrogen (e.g., substituted for diesel) above which desired engine power may not be attained. In another embodiment, the maximum substitution ratio may be an amount of hydrogen above which engine knock occurs or a likelihood of engine knock is increased above a knock threshold.

As shown in FIG. 2, the engine is coupled to an electric power generation system, which includes an alternator/generator 122 and the electric traction motors. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to the electric traction motors and the alternator/generator may provide electrical power to the electric traction motors. As depicted, the electric traction motors are each connected to one of a plurality of wheels to provide tractive power to propel the locomotive. One embodiment of a locomotive configuration includes one traction motor per wheel. As depicted herein, six pairs of traction motors correspond to each of six pairs of wheels of the locomotive.

The engine may have one or more turbochargers 126 arranged between the intake passage and the exhaust passage. The turbocharger charges ambient air drawn into the intake passage to provide greater charge density (e.g., to increase an amount of charged air) during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. In one example, the turbocharger may be a variable geometry turbocharger. As such, an aspect ratio of the turbocharger may be varied according to operating conditions, thereby increasing efficiency at high engine speeds and reducing turbo lag. Further, in some embodiments, a waste gate 171 may be provided which allows exhaust gas to bypass the turbocharger. The waste gate may be opened, for example, to divert the exhaust gas flow away from the turbine. In this manner, the rotating speed of the compressor, and thus the boost provided by the turbocharger to the engine may be controlled. When the turbocharger is the variable geometry turbocharger, adjustment of the turbine geometry may be coordinated with opening/closing of the waste gate to achieve a desired effect on charge air supply to the engine. In some embodiments, an e-turbo may be included. The e-turbo may be an electric motor, coupled to a shaft of the turbocharger, which may extract excess exhaust energy from the turbocharger and/or motor the compressor to increase air flow. Where the e-turbo is present, the controller may use the e-turbo to control the turbine speed by adding torque at the cost of electricity or by dynamically braking the system with the e-turbo motor to generate electricity.

The engine may have an exhaust gas recirculation (EGR) system 170. The EGR system may route exhaust gas from the exhaust passage upstream of the turbocharger to the intake passage downstream of the turbocharger. The EGR system includes an EGR passage 172 and an EGR valve 174 for controlling an amount of exhaust gas that is recirculated from the exhaust passage of the engine to the intake passage of the engine. By introducing exhaust gas to the engine, the amount of available oxygen for combustion is decreased, thereby reducing the combustion flame temperatures and reducing the formation of nitrogen oxides (e.g., NOx). Adjusting the amount of exhaust gas recirculated thus adjusts an oxidant content available for combustion. The EGR valve may be an on/off valve controlled by the locomotive controller, or it may control a variable amount of EGR, for example.

The EGR system may further include an EGR cooler 176 to reduce the temperature of the exhaust gas before it enters the intake passage. As depicted in the non-limiting example embodiment of FIG. 2, the EGR system is a high-pressure EGR system. In other embodiments, the locomotive may additionally or alternatively include a low-pressure EGR system, routing EGR from a location downstream of the turbocharger to a location upstream of the turbocharger. Additionally, the EGR system may be a donor cylinder EGR system where one or more cylinders provide exhaust gas only to the EGR passage, and then to the intake.

The engine system may further include multiple methods of providing EGR. Herein, EGR is defined as an exhaust gas from a previous cycle retained or reingested by one or more cylinders for a subsequent combustion event. EGR may be provided via a dedicated donor cylinder, an adjusted exhaust valve timing, and/or the EGR passage. The donor cylinder may expel exhaust gases from its interior volume and flow the exhaust gases to another cylinder fluidly coupled thereto. Additionally or alternatively, the donor cylinder may expel exhaust gases directly to the EGR passage, thus adjusting an oxidant content available for combustion. The adjusted exhaust valve timing may include where an exhaust valve opening may overlap with an intake valve opening, resulting in a vacuum of the cylinder drawing expelled exhaust gases back into the cylinder. The EGR rate may be set via the donor cylinder(s), the adjusted exhaust valve timing, and/or valve position in the EGR passage. For example, adjusting valve timing may include changing a timing of opening/closing the intake and exhaust valves at the engine relative to cylinder cycle.

The locomotive may include an exhaust gas treatment system coupled in the exhaust passage to reduce controlled emissions. In one embodiment, the exhaust gas treatment system may include a diesel oxidation catalyst (DOC) 130 and a diesel particulate filter (DPF) 132. The DOC may oxidize exhaust gas components, thereby decreasing carbon monoxide, hydrocarbons, and particulate matter emissions. The DPF can trap particulates, known as particulate matter (an example of which is soot), produced during combustion. Suitable DOCs can be made from ceramic or cermet. Suitable material may be alumina or silicon carbide. In other embodiments, the exhaust gas treatment system may additionally include a selective catalytic reduction (SCR) catalyst, three-way catalyst, NO trap, various other emission control devices or combinations thereof. In some embodiments, the exhaust gas treatment system may be positioned upstream of the turbocharger, while in other embodiments, the exhaust gas treatment system may be positioned downstream of the turbocharger.

The locomotive may include a throttle 142 coupled to the engine to indicate power levels. In this embodiment, the throttle may have a plurality of notches. Each notch may correspond to a determined discrete power level, such as a known peak efficiency operating point. The power level indicates an amount of load, or engine output, placed on the locomotive and controls the speed at which the locomotive will travel. Although eight notch settings are depicted in the embodiment of FIG. 2, in other embodiments, the throttle notch may have more than eight notches or less than eight notches, as well as notches for idle and dynamic brake modes. In some embodiments, the notch setting may be selected by a human operator of the locomotive. In other embodiments, the consist controller may determine a trip plan (e.g., a trip plan may be generated using trip optimization software, such as Trip Optimizer system (available from Wabtec Corporation) and/or a load distribution plan may be generated using consist optimization software such as Consist Manager (available from Wabtec Corporation) including notch settings based on engine and/or locomotive operating conditions, as will be explained in more detail below.

The engine controller may control various components related to the locomotive. As an example, various components of the locomotive may be coupled to the engine controller via a communication channel or data bus. In one example, the engine controller and the consist controller each include a computer control system. The engine controller and consist controller may additionally or alternatively include a memory holding non-transitory computer readable storage media (not shown) including code for enabling on-board monitoring and control of locomotive operation. The engine controller may be coupled to the consist controller, for example, via a digital communication channel or data bus.

Both the engine controller and the consist controller may receive information from a plurality of sensors and may send control signals to a plurality of actuators. The engine controller, while overseeing control and management of the locomotive, may receive signals from a variety of engine sensors 150, as further elaborated herein, to determine operating parameters and operating conditions, and correspondingly adjust various engine actuators 152 to control operation of the locomotive. For example, the engine controller may receive signals from various engine sensors including, but not limited to, engine speed, engine load, intake manifold air pressure, charged air pressure, exhaust pressure, ambient pressure, ambient temperature, exhaust temperature, engine temperature, exhaust oxygen levels, and so on. The engine sensors may include one or more knock sensors 173 coupled to combustion chambers of the engine. The knock sensors may detect vibrations and sound from the combustion chambers and convert the vibrations and sound into electronic signals that are relayed to the engine controller. Correspondingly, the engine controller may control the locomotive by sending commands to various components such as the electric traction motors, the alternator/generator, cylinder valves, fuel injectors, the notch throttle, and so on. Other actuators may be coupled to various locations in the locomotive.

The consist controller may include a communication portion operably coupled to a control signal portion. The communication portion may receive signals from locomotive sensors including locomotive position sensors (e.g., GPS device), environmental condition sensors (e.g., for sensing altitude, ambient humidity, temperature, and/or barometric pressure, or the like), locomotive coupler force sensors, track grade sensors, locomotive notch sensors, brake position sensors, and so on. Various other sensors may be coupled to various locations in the locomotive. The control signal portion may generate control signals to trigger various locomotive actuators. Example locomotive actuators may include air brakes, brake air compressor, traction motors, and so on. Other actuators may be coupled to various locations in the locomotive. The consist controller may receive inputs from the various locomotive sensors, process the data, and trigger the locomotive actuators in response to the processed input data based on instruction or code programmed therein corresponding to one or more routines. Further, the consist controller may receive engine data (as determined by the various engine sensors, such as an engine coolant temperature sensor) from the engine controller, process the engine data, determine engine actuator settings, and transfer (e.g., download) instructions or code for triggering the engine actuators based on routines performed by the consist controller back to the engine controller.

For example, the consist controller may determine a trip plan to distribute load amongst all locomotives in the train, based on operating conditions. In some conditions, the consist controller may distribute the load unequally, that is, some locomotives may be operated at a higher power setting, or higher notch throttle setting, than other locomotives. The load distribution may be based on a plurality of factors, such as fuel economy, coupling forces, tunneling operating, grade, and so on. In one example, the load distribution may be adapted based on a distribution of the locomotive consist, e.g., a positioning of each of the locomotives of the locomotive consist, across the train. For example, at least one locomotive may be positioned at an end of the train and at least one locomotive may be positioned at a front of the train. The locomotive at the end of the train may push propulsion of the train and the locomotive at the front of the train may pull the train, particularly during uphill navigation. As such, a greater load may be placed on the pushing locomotive at the end of the train.

Turning now to FIG. 3, an embodiment 300 of the fuel tender of FIG. 1 is shown. As described above, the fuel tender includes the fuel storage tank, the controller, and an engine 302. The fuel tender may further include a first unit 304, which may be a device for controlling a temperature and pressure within the fuel storage tank. For example, when LNG is stored in the fuel storage tank, the first unit may be a cryogenic unit. The fuel storage reservoir sizes and configurations may be selected based on end use parameters, may be removable from the fuel tender, and may receive fuel from an external refueling station via a port 306.

The fuel storage tank may supply fuel to a fuel modification unit 312. The fuel modification unit may adjust a characteristic of the fuel. For example, the fuel may be converted from a liquid phase to a gas phase at the fuel modification unit, such as when the fuel is LNG. As another example, the fuel modification unit may be a pump to adjust a delivery pressure of the fuel when the fuel is stored in the gas phase. In other examples, where fuel modification is not demanded, the fuel modification unit may be omitted. The fuel may be delivered from the fuel modification unit to engines of the locomotives.

By supplying fuel from the fuel storage tank to the locomotive engines and the engine of the fuel tender, the fuel may be combusted by the engines distributed across the train. In another non-limiting embodiment, the fuel tender engine may generate electricity that may be delivered to one or more components on-board the fuel tender and/or on-board the locomotives. In one embodiment, as depicted in FIG. 3, the fuel tender engine may generate torque that is transmitted to a power conversion unit 314 via a drive shaft 316. The power conversion unit may convert the torque into electrical energy that is delivered via electrical bus 318 to a variety of downstream electrical components in the fuel tender. Such components may include, but are not limited to, the first unit, the fuel modification unit, the controller, a pressure sensor 320, a temperature sensor 322, one or more batteries 324, various valves, flow meters, additional temperature and pressure sensors, compressors, blowers, radiators, batteries, lights, on-board monitoring systems, displays, climate controls, and the like, some of which are not illustrated in FIG. 3 for brevity. Additionally, electrical energy from the electrical bus may be provided to one or more components of the locomotives.

In one embodiment the power conversion unit includes an alternator (not shown) that is connected in series to one or more rectifiers (not shown) that convert the alternator's AC electrical output to DC electrical power prior to transmission along the electrical bus. Based on a downstream electrical component receiving power from the electrical bus, one or more inverters may invert the electrical power from the electrical bus prior to supplying electrical power to the downstream component. In one embodiment, a single inverter may supply AC electrical power from a DC electrical bus to a plurality of components. In another non-limiting embodiment, each of a plurality of distinct inverters may supply electrical power to a distinct component.

The controller on-board the fuel tender may control various components on-board the fuel tender, such as the fuel modification unit, the fuel tender engine, the power conversion unit, the first unit, control valves, and/or other components on-board the fuel tender, by sending commands to such components. The controller may also monitor fuel tender operating parameters in active operation, idle and shutdown states. Such parameters may include, but are not limited to, the pressure and temperature of the fuel storage tank, a pressure and temperature of the fuel modification unit, the fuel tender engine temperature, pressure, and load, compressor pressure, heating fluid temperature and pressure, ambient air temperature, and the like. In one embodiment, the fuel tender controller may execute code to auto-stop, auto-start, operate and/or tune the engine and the fuel modification unit in response to one or more control system routines. The computer readable storage media may execute code to transmit to and receive communications from the engine controllers on-board the locomotives.

The fuel tender depicted in FIG. 3 is a non-limiting embodiment of the fuel tender. In other embodiments, the fuel tender may include additional or alternative components. As an example, the fuel tender may further include one or more additional sensors, flow meters, control valves, various other device and mechanisms for controlling fuel delivery and storage conditions, and so on.

The ICE may be a multi-fuel engine of a locomotive, where the locomotive may be one of multiple locomotives in a locomotive consist of a train, as shown in FIG. 1. FIG. 2 shows a schematic diagram of an example embodiment of a locomotive of the locomotive consist of FIG. 1, the locomotive having a multi-fuel engine. Methods described herein may be implemented in at least one multi-fuel engine of the locomotive consist. The train of FIG. 1 may further include a fuel tender for storing at least one fuel which may be used by the multi-fuel engine, an embodiment of which is shown in FIG. 3. In the embodiment described herein, the multi-fuel engine may use a fuel mixture of a first fuel and a second fuel, the first fuel having a faster combustion flame speed relative to the second fuel. For example, the first fuel may be hydrogen and the second fuel may be diesel. A fuel mixture, including a first amount of hydrogen and a second amount of diesel, may be combusted with an amount of air to provide power to the vehicle. A combustion mixture (e.g., the amount of air and the fuel mixture) may be adjusted to provide a demanded power output, reduce emissions, and reduce a likelihood of engine knock during changing engine operating conditions and ambient conditions. For example, an air-to-fuel ratio (AFR) (e.g., a ratio of the amount of air to the amount of fuel mixture in the combustion mixture), may be adjusted based on engine operating conditions and ambient conditions such that a substitution ratio of hydrogen to diesel may be maximized. FIG. 4 shows an example method for adjusting the AFR of the multi-fuel engine. The AFR may be adjusted by adjusting settings for engine operating parameters, which may include a turbo speed, a waste gate position, injection timing, and exhaust gas recirculation (EGR). Additionally, a substitution ratio of hydrogen for diesel (e.g., of the fuel mixture) may be adjusted in response to the adjusted AFR. FIG. 5 shows a timeline illustrating adjustments to operating parameters of the multi-fuel engine to adjust the AFR, and resulting changes in emissions and propensity for engine knock.

The AFR is actively adjusted to achieve a desired substitution ratio. As multi-fuel engines may run lean, increasing the AFR during multi-fuel combustion may be desirable. The AFR may be increased by increasing an amount of charged air delivered to the engine relative to the amount of injected fuel. Engine settings and operating parameters including EGR, charged air, and waste gate position may be adjusted to increase the amount of charged air.

A desirable amount of AFR increase may be determined by a desired substitution ratio. When the multi-fuel engine transitions from a single fuel combustion mode to a dual fuel combustion mode, a likelihood of engine knock and emissions may increase due to the co-combustion of two or more fuels. For example, engine efficiency, power output, and emissions may be affected by co-combustion of hydrogen and diesel. The AFR may be adjusted based on current operating conditions to a desired AFR, for example, an AFR determined by a vehicle manufacturer or engine control system. However, a likelihood of engine knock may be high and an emissions level may be greater than a desired emissions threshold. The substitution ratio may be independently adjusted to a predetermined substitution ratio, either independently or in response to adjustment of the AFR, to reduce the likelihood of engine knock and emission levels. Using predetermined AFR and substitution ratios for dual fuel combustion of the multi-fuel engine may still allow a high likelihood of engine knock and emission levels above the emissions threshold, for example, when ambient conditions and/or engine operating conditions differ from those used to set the predetermined AFR and substitution ratio. Thus, a method is desired for adjusting a substitution ratio of a first fuel to a total amount of fuel (e.g., a sum of the first fuel and the second fuel) such that the substitution ratio is maximized (e.g., to allow stable combustion) while mitigating a likelihood of engine knock and decreasing emissions. The substitution ratio may be adjusted in response to adjustment of the AFR, for example, the substitution ratio may increase due to an increase in AFR. The AFR may be adjusted using engine settings determined based on engine operating conditions and ambient conditions, as further described herein. Engine settings may be determined such that, when implemented, the AFR may increase, the substitution ratio may increase, emissions may remain below the emissions threshold, and a likelihood of engine knock may be mitigated.

Adjustments made to the AFR may be controlled by allowable operating conditions. For example, adjusting the AFR may include opening or closing a waste gate. A waste gate position may vary between 100% open and 100% closed. However, if the waste gate is 100% closed and further adjustment to the AFR is requested, a different engine setting may be used to adjust the AFR. The AFR may be adjusted by varying an amount of charged air delivered to the engine, by adjusting turbo speed, waste gate position, engine speed, (e.g., where waste gate position and engine speed affect turbo speed) an amount of fuel combusted with air (e.g., injection timing), and manifold air temperature (MAT). EGR may be adjusted to help maintain emissions below the emissions threshold by adjusting an oxidant content available for combustion.

Adjusting the AFR may include signaling a turbocharger of the engine to adjust an air output level of the turbocharger such that the amount of air introduced to the fuel mixture may be changed. The air output level may thus be adjusted based at least in part on achieving a desired amount of air in the combustion mixture relative to the amount of fuel mixture. The desired amount of air may be determined based on engine operating conditions, such as engine speed, manifold air temperature, and so on, and ambient conditions such as temperature and pressure. For example, the controller of the vehicle may monitor ambient conditions and engine operating conditions via sensors, as described above, and determine a desired AFR at which emissions are below an emissions threshold and power output is equal to a desired power output. The AFR may be adjusted in response to, for example, a measurement that the ambient temperature is greater than a determined threshold value and engine power is greater than a power threshold. For example, the power threshold may be engine power during cruising and the power threshold may be exceeded during acceleration. In another example, the AFR and/or substitution ratio may be adjusted in response to engine knock (e.g., as measured by an engine knock sensor) or emissions exceeding the emissions threshold.

Signaling the turbocharger to adjust the air output level to achieve the desired AFR may increase a charged air amount. Signaling the turbocharger may include closing the waste gate, closing a turbine nozzle ring, adjusting nozzle vanes when the turbocharger is the variable geometry turbocharger, or making other adjustments to the engine system which may result in an increased charged air amount. For example, the e-turbo can be operated either to consume energy and rotate the compressor or it can be operated as a generator and harvest excess energy. The amount of charged air increase may be selected based at least in part on one or more of engine settings. For example, engine settings including one or more of exhaust gas recirculation (EGR), injection timing, turbocharger setting (e.g., to adjust charged air amount), and waste gate position may be adjusted as further described in FIGS. 4-5. Engine settings may be adjusted within pre-determined parameters, for example, the waste gate position may be adjusted between 0 and 100% open, and injection timing may be advanced or delayed. Within these parameters, each engine setting may be individually adjusted, and engine power output and emissions may be monitored to achieve desired power output and emissions. As further described in FIG. 4, methods for determining engine settings which maintain the engine power and emissions within respective desired ranges, and which allow the desired charged air amount increase for adjusting the AFR, may include using engine calibration mapping, a look-up table, or other method for determining engine settings. In some embodiments, the substitution ratio may be varied without adjusting the AFR, for example, when operating conditions allow adjustment of the substitution ratio (e.g., increasing an amount of hydrogen) while not increasing an amount of air relative to the amount of fuel.

Conditions that may affect the substitution ratio may include engine airflow, engine load, intake manifold temperature, ambient pressure and ambient temperature, engine temperature, and exhaust manifold pressure. A maximum substitution ratio may be constrained by a knock threshold.

The knock threshold may be based on a pressure rise rate or maximum cylinder pressure. For example, engine knock may be measured using a knock sensor or vibration sensor, or using measured/inferred timing of combustion relative to the expected timing of combustion.

For example, the substitution ratio may be increased such that an amount of hydrogen is greater than an amount of diesel as long as a likelihood of engine knock remains below the knock threshold and the multi-fuel engine can combust the fuel mixture to provide desired power to the vehicle.

In one embodiment, an amount of a first fuel may be mixed with an amount of a second fuel to create a fuel mixture having a determined fuel ratio of the first fuel relative to a total amount of fuel (e.g., a sum of the first fuel and the second fuel). In the herein described embodiment, the determined fuel ratio is equivalent to the substitution ratio, where the determined fuel ratio may be a volumetric ratio of the first fuel to the total amount of fuel or an energy output ratio of the first fuel to the total amount of fuel. The first fuel may have a faster combustion flame speed relative to the second fuel. In the herein described embodiment, the first fuel is hydrogen and the second fuel is diesel. However, other fuels may be used. The determined fuel ratio may be a nominal ratio set by a vehicle manufacturer according to ambient conditions, e.g., temperature, barometric pressure, etc., and engine operating point. Furthermore, the determined substitution ratio may be a ratio estimated to provide a target power output while maintaining emissions below an emissions threshold (e.g., as set by the vehicle manufacturer or government). The determined substitution ratio may also be estimated based on engine calibration mapping, which inputs various parameters (e.g., horsepower, engine speed, barometric pressure, ambient temperature, MAT, MAP) and outputs nominal settings for the substitution ratio, EGR, waste gate position, and injection timing. These nominal settings may enable emissions to be maintained below the emissions threshold. An amount of the fuel mixture may be combusted with an amount of air to form a combustion mixture having a determined air-to-fuel ratio (AFR). Either or both of a speed of combustion and a stability of combustion of the fuel mixture may be controlled by changing at least one of the fuel ratio (e.g., adjusting a substitution ratio) and the AFR.

The substitution ratio may be adjusted in response to the adjusted AFR, as further described in FIGS. 4-5. For example, as the amount of air in the combustion mixture increases, it may be desired to increase an amount of hydrogen in the fuel mixture, as hydrogen has a faster combustion flame speed relative to diesel. The faster combustion flame speed may stabilize combustion during multi-fuel combustion at the engine. Additionally, increasing the substitution ratio reduces combustion of diesel and corresponding carbon-based emissions. Furthermore, increasing the substitution ratio may leverage a wide flammability range of hydrogen, e.g., relative to diesel, allowing engine performance to be increased under lean combustion.

A controller of the vehicle system may use a plurality of different control strategies to adjust settings for parameters such as injection timing, EGR, waste gate position, and substitution ratio to selectively control the AFR, as shown in FIG. 4. In some instances, the parameters may be at settings that enable the substitution ratio to be increased without adjusting the AFR. In one example, the AFR may be increased within engine constraints without adjusting engine settings. An example operating sequence is shown in FIG. 5, where both substitution ratio and AFR are adjusted. FIG. 5 may be an example operating sequence of the method of FIG. 4.

Turning now to FIG. 4, a flow chart shows a method 400 for controlling either or both of a combustion speed and combustion stability by actively adjusting at least one of an AFR and a substitution ratio within at least one multi-fuel engine of the locomotive consist. The multi-fuel engine may combust more than one fuel, including a first fuel and a second fuel. The first fuel may be hydrogen and the second fuel may be diesel. Active control of the AFR and/or the substitution ratio may mitigate hydrogen auto-ignition, which may occur during operation of the multi-fuel engine in a multi-fuel mode. The method may be executed by a controller of a vehicle, such as the engine controller of FIGS. 1-3, based on instructions stored in a memory of the controller.

At step 402, the method includes estimating and/or measuring vehicle operating parameters and/or conditions. Vehicle operating parameters and/or conditions may be estimated based on one or more outputs of various sensors of the vehicle (e.g., such as one or more exhaust temperature sensors, an engine speed sensor, a wheel speed and/or a turbo shaft speed sensor, a torque sensor, a manifold pressure sensor, etc., as described above in reference to FIGS. 1-3). Vehicle operating conditions may include engine speed, current AFR, engine load, engine power, turbo speed, injection timing, waste gate position, vehicle velocity, transmission oil temperature, exhaust gas flow rate, mass airflow rate, coolant temperature, coolant flow rate, engine oil pressures (e.g., oil gallery pressures), manifold air temperature and pressure, cylinder temperatures, operating modes of one or more intake valves and/or one or more exhaust valves, electric motor velocity, battery charge, engine torque output, vehicle wheel torque, and the like. Additionally, ambient conditions may be estimated and/or measured, including barometric pressure, ambient temperature, humidity, and so on.

At step 404, the method includes determining if the engine is operating in a multi-fuel mode or if the multi-fuel mode is requested. Multi-fuel combustion may be desired based on various conditions, including but not limited to one or more of an engine load, an emissions target, a fuel cost, a combustion mixture efficiency, and a fuel availability. For example, at high engine loads, exclusive combustion of diesel may be desirable to maximize power output. The emission target may be based on an individual vehicle emission target based on a government standard. Additionally or alternatively, the emission target may be based on a local government standard for a geofenced location. For example, a city may include a different emission target than a rural location. A combustion mixture may be customized for a plurality of vehicles operating in the city such that total emissions from the plurality of vehicles may meet local emission targets. By doing this, emission targets of individual vehicles may be exceeded at certain operating points to balance emissions of the plurality of vehicles to meet local emission targets.

In some examples, dual fuel combustion may be desired based on fuel cost. The fuel cost may be determined via feedback from one or more of a plurality of vehicles, refueling stations, vehicle operators, and so on. An average fuel cost may be determined for each type of fuel included in the consist. For example, if the consist includes diesel and hydrogen, costs for each of the fuel types may be determined and a combustion mixture (e.g., a substitution ratio) may be adjusted based on at least the costs of the fuel types. In one embodiment, it may be desired to minimize the cost of the combustion mixture.

In further embodiments, additionally or alternatively, the combustion mixture efficiency may dictate a combustion mixture. The substitution ratio may be adjusted to maximize the combustion mixture efficiency in one embodiment, as further described herein. In other embodiments, the combustion mixture may be adjusted to maximize an engine power output. A vehicle operator may select to prioritize engine power output or the combustion mixture efficiency.

Additionally or alternatively, a vehicle controller may select whether multi-fuel combustion is desired based on fuel availability. For example, certain locations may not include fuel stations including alternative fuels such as HDRD, ammonia, hydrogen, and the like. The vehicle controller may request combustion of a single fuel, e.g., if other sources of fuel are not available at local fuel stations. The vehicle controller may be onboard or offboard the vehicle, depending on the selected configuration. In one embodiment, the vehicle controller is an operator that is located onboard the vehicle during operation. As another embodiment, dual fuel combustion may be desired based on fuel costs. Average fuel costs may be determined via a processor of a central server receiving feedback from controllers of a plurality of controllers of different vehicle systems. The average fuel costs may be determined for each fuel type within various geofenced areas. For example, geofenced areas may include streets, cities, schools, zip codes, states, radii from a current vehicle location, and landmarks.

If dual fuel combustion is not desired, at step 406, the method includes combusting only a single fuel. In one embodiment, the single fuel may be a carbon-containing fuel or a non-renewable fuel. For example, the single fuel may be diesel. In other embodiments, the single fuel may be a renewable fuel, such as HDRD, hydrogen, and/or biodiesel.

If multi-fuel combustion is desired, at step 408, the method includes determining a target substitution ratio and combusting hydrogen and diesel. The target substitution ratio may be estimated based on variables such as the current engine operating point (e.g., load and speed), ambient temperature and ambient pressure. For example, look-up tables or maps may be stored in the controller's memory providing substitution ratios according to different values of the variables. The hydrogen and diesel are combusted at the target substitution ratio. A likelihood of auto-ignition and knock may be increased due to a faster combustion rate of pre-mixed hydrogen relative to diesel or other non-carbon containing fuels.

Flame speed and auto-ignition characteristics of hydrogen may be mitigated by increasing the AFR, thereby reducing combustibility of the fuel mixture and reducing a likelihood and severity of fuel auto-ignition. The AFR may be actively adjusted based on engine conditions and ambient conditions, for example, by adjusting engine settings including exhaust gas recirculation, waste gate position, injection timing, and turbocharger settings. Active adjustment of the AFR may include adjusting the engine settings to determined engine settings in response to current, e.g., real-time, operating conditions and leveraging an allowable amount of variability in the AFR based on the current operating conditions to maximize the substitution ratio, provide sufficient engine power, and maintain emissions below an emissions threshold, as described above. The substitution ratio may also be adjusted to mitigate engine knock in response to the modified AFR, as well as the current operating conditions. Higher substitution (e.g., increasing an amount of hydrogen relative to an amount of diesel) may be provided to the engine during lower engine loads due to an elevated likelihood of knock and/or pre-ignition at higher loads. For example, more fuel energy content of a hydrogen/diesel mixture may be provided by hydrogen when the mixture is injected at a higher substitution ratio than at a lower substitution ratio. In some embodiments, the combustion mixture may include additional fuels less combustible than hydrogen at higher engine loads to decrease consumption of diesel or other non-renewable carbon-containing fuels.

At step 410, the method includes confirming if the AFR can be adjusted. For example, it may be desirable to increase AFR, within an allowable AFR range according to operating conditions, to maximize the substitution ratio, increase combustion efficiency and fuel efficiency, and to lower emissions. More specifically, combustion of the hydrogen/diesel mixture may allow engine operation at higher AFRs overall than exclusive combustion of diesel. For example, the controller may obtain information from the various sensors monitoring engine settings and determine whether one or more of the engine settings may be modified to increase the AFR.

Increasing the AFR to a maximum AFR may include increasing the AFR to a value at which engine emissions are equal to or approaching the emissions threshold. Additionally or alternatively, the maximum AFR may be defined as increasing the AFR as much as is allowable within engine constraints. For example, the AFR may be increased to a highest AFR value at which peak cylinder pressure is at or below a cylinder pressure threshold, and/or NOx emissions are below a NOx emission threshold. In a further example, the maximum AFR may be identified as an AFR value at which misfire occurs due to a lean fuel mixture and thus, the AFR may be adjusted to an AFR less than the maximum AFR.

Increasing the AFR may reduce peak cylinder pressure by slowing down combustion under a first set of conditions, and may increase peak cylinder pressure under a second set of conditions due to an increase in the amount of air introduced to the fuel mixture. Thus, the AFR may be adjusted in such a way that the peak cylinder pressure is below the cylinder pressure threshold, which may include increasing or decreasing the AFR depending on engine conditions. Under some engine conditions, a change in peak cylinder pressure due to adjustment of the AFR may be negligible (e.g., the peak cylinder pressure may not increase to approach the cylinder pressure threshold due to adjustment of the AFR). The controller may refer to engine calibration maps stored at the controller's memory, the maps providing nominal settings of engine parameters according to altitude, ambient temperature for a determined average engine performance. Variables, such as horsepower, engine speed, barometric pressure, ambient temperature, manifold air temperature, and manifold pressure, may be input to the engine calibration maps. The nominal setting for parameters affecting the AFR, such as EGR, injection timing, waste gate position, as well as a nominal setting for the substitution ratio, may be output from the engine calibration maps. The nominal settings may be selected to allow engine operation to meet a power demand while maintaining emissions below the emissions threshold, where control of emissions is provided at least in part by EGR flow.

In one example, a target substitution ratio may be determined, where the target substitution ratio may be a maximum substitution ratio corresponding to input at the engine calibration maps and the engine operating point. The output nominal settings may provide suitable settings for adjusting the AFR to enable the target substitution ratio to be injected. For example, the maximum substitution ratio may be based on conditions including the maximum AFR described above, and engine conditions based on a variety of parameters including turbo speed, peak cylinder pressure, and so on.

In one embodiment, AFR adjustment may be desired when ambient temperature is greater than a temperature threshold and engine power is greater than a power threshold. For example, the power threshold may be engine power during cruising. Engine power may be greater than the power threshold during acceleration, during hauling of multiple cars (e.g., cars 108 of FIG. 1), and so on. The temperature threshold may be a temperature greater than a historic average temperature for a region as determined by a vehicle manufacturer. In another embodiment, the temperature threshold may be an ambient temperature above which a likelihood of fuel auto-ignition is increased. Engine power may be greater than the power threshold when demanded by a user, for example, when a notch increase is demanded. In another example, engine power may be greater than the power threshold when the locomotive consist load is high, such as when the locomotive is hauling and/or pushing multiple cars up an incline.

If AFR adjustment is desired, a desired AFR may be further determined using the current ambient temperature and pressure. In other embodiments, the desired AFR may be determined based on carbon emissions (e.g., COx, hydrocarbons, and other carbon containing combustion byproducts) and/or NOx emissions. For example, a high AFR may result in high COx and hydrocarbon emissions, as well as a high amount of unburned fuel during combustion of the fuel mixture or low pressure direct injection (LPDI). A low AFR may result in high unburned fuel, high CO emissions, and high NOx emission when using high pressure direct injection (HPDI). High NOx emissions may also occur at a low AFR used during LPDI. For example, a high AFR may result in high CO and particulate matter emissions if HPDI fuel is a carbon-containing fuel.

The AFR may be adjusted, e.g., increased, if one or more of the parameters affecting the AFR is at a current setting that does not already provide a maximum effect on the AFR. For example, when the engine speed is at a maximum speed, the engine speed cannot be increased to increase the AFR. Similarly, when the waste gate is fully closed and the turbocharger is operating at a maximum speed, the AFR cannot be increased by either adjusting the waste gate or the turbocharger speed.

Furthermore, adjustment to the AFR may be desirable in response to modifications to EGR flow. For example, engine temperature may be detected to rise, increasing a likelihood of NOx emissions. Additionally or alternatively, NOx levels in the engine exhaust may increase based on a signal from an exhaust gas sensor. As such, EGR flow may be increased to reduce peak cylinder temperatures at the engine, which may reduce NOx levels in engine exhaust. An amount of EGR delivered to the engine may depend on the engine temperature, NOx levels in the engine exhaust, and peak in-cylinder pressure. As an example, if peak in-cylinder pressures are at or near a maximum tolerated pressure of the engine cylinders, the AFR may be decreased to allow EGR to be provided to the engine without exceeding the maximum tolerated pressure of the cylinders, while maintaining the target substitution ratio. Alternatively, if a decrease in EGR flow is demanded, e.g., due to operation at high engine loads, the AFR may be increased, given that the increased is enabled based on the settings of the parameters affecting the AFR, as described above.

If each of the parameters affecting the AFR are at a respective setting that inhibits increasing the AFR, and/or adjusting the AFR in response to changes in EGR flow is not demanded, the AFR is not adjusted and the method continues to step 412 to continue engine operating under the current settings and conditions. The method returns to the start. If at least one of the parameters affecting the AFR is determined to have a capacity to increase charged air delivered to the engine, and/or EGR is varied, the method proceeds to step 414 to adjust the AFR while maximizing the substitution ratio of the fuel mixture injected at the engine.

Adjusting the AFR, as described above, may include varying one or more of the parameters affecting the AFR. For example, the engine speed may be increased by increasing a fueling rate and/or adjusting the injection timing, the turbocharger speed may be increased by restricting exhaust flow through the waste gate, and the MAT may be adjusted by adjusting a level of EGR and/or aftercooler or EGR cooler outlet temperatures. For example, the MAT may be decreased by decreasing a cooling fluid temperature or increasing a coolant flow rate to the aftercooler and/or EGR cooler.

Increasing the AFR may include adjusting a setting of the turbocharger such that an increased amount of air may mix with diesel and hydrogen. Signaling the turbocharger to adjust the air output level to achieve the desired AFR may include increasing a charged air amount. The amount of charged air increase may be selected based at least in part on one or more of engine settings. For example, engine settings may include one or more of current exhaust gas recirculation, injection timing, turbocharger setting (e.g., to adjust charged air amount), and waste gate position. In one embodiment, engine operating conditions and ambient conditions as measured and/or estimated at step 402 and current engine settings may be input to a look-up table or engine calibration mapping method to determine the desired amount by which to increase charged air. The charged air may be increased toward a desired charged air amount based on a peak cylinder pressure, maximum turbocharger speed, and maximum desired emission. The peak cylinder pressure may be sensed via an in-cylinder pressure sensor or estimated based on a manifold pressure and temperature. A maximum turbocharger speed may be based on one or more of a maximum choke, mechanical properties of a compressor and/or turbine, manifold pressure and temperature, the engine temperature, the in-cylinder pressure, and an EGR flow rate.

Additionally or alternatively, a current maximum turbocharger speed may be maximized at a threshold peak cylinder pressure. If the peak cylinder pressure is approaching the threshold peak cylinder pressure, then the current maximum turbocharger speed may be reduced to avoid exceeding the threshold peak cylinder pressure.

The substitution ratio may be adjusted accordingly based on a set relationship between the AFR and the substitution ratio. For example, the substitution ratio may increase linearly with the increase in AFR, or non-linearly. As another embodiment, the substitution ratio may have a weighted correlation with the AFR. The substitution rate may be adjusted relative to a multidimensional map or transfer function where the desired substitution ratio could be dependent on one or more of engine speed, engine load, MAT, EGR rate, AFR or other engine parameters.

In some embodiments, the substitution ratio may be adjusted independently of the AFR. For example, the substitution ratio may be adjusted independently when the engine is operating at low power and/or low intake manifold temperatures. Additionally or alternatively, adjustments made to the substitution ratio when the substitution ratio is relatively low (e.g., closer to an AFR used for single fuel combustion than the maximum AFR) may be made independently of AFR adjustment. Further, some engines may not include AFR control, yet the substitution ratio may be adjusted.

In another embodiment, ammonia may be injected in addition to or instead of hydrogen to decrease the combustion rate at the engine. Injection of ammonia as an additional fuel may be similar to injection of hydrogen. For example, a substitution ratio of ammonia for diesel may be proportional to an AFR adjustment or may be a weighted amount relative to the AFR adjustment amount.

At step 416, the method includes determining if knock is detected at one or more cylinders of the engine. Knock may be monitored by knock sensors coupled to the cylinders and a magnitude of a signal, the signal proportional to a vibration or sound level observed at the cylinders, may be transmitted to the controller and compared to a threshold knock signal level. The threshold knock signal level may, as one example, be a signal magnitude corresponding to a calibrated vibration/sound level indicative of knock. As another example, the threshold knock signal level may represent a signal level approaching the calibrated level indicative of knock, e.g., within a margin of the calibrated level indicative of knock, thereby enabling adjustments to the substitution rate, injection timing, and/or EGR flow to be made before knock occurs.

If knock (or impending knock) is detected at one or more of the cylinders, hereafter, the affected cylinder(s), the method proceeds to step 418 to adjust at least one of the substitution ratio and injection timing at the affected cylinder(s). For example, the injection timing may be advanced or delayed to modify peak in-cylinder pressure and temperature, thereby mitigating knock. The substitution ratio may be decreased to alleviate knock at the affected cylinder(s). In some examples, the injection timing may be prioritized over decreasing the substitution ratio to maintain a maximum allowable substitution ratio. For example, the substitution ratio of the combustion mixture may be adjusted in response to the fuel availability. In certain locations, one or more of the fuels included in the consist may include a low availability. Consumption of a fuel with low availability may be reduced in some examples. Consumption of a fuel with higher availability may be increased. Fuel availability may be determined based on feedback from a plurality of vehicles and refueling stations. The availability may be determined based on a range from a current location of the vehicle. The range may be equal to miles remaining based on current fuel levels.

In one embodiment, an EGR flow rate may further influence the injection timing. In one embodiment, a first fuel injection timing and/or a second fuel injection timing may be delayed in response to EGR flowing to the engine. A magnitude of the delay may be proportional to the EGR flow rate. For example, injection timing may be delayed in response to EGR flow due to an increase in the intake manifold temperature. Injection timing may be advanced in response to EGR flow in another example, as EGR may help reduce the likelihood of knock and reduce NOx emissions which may allow for advanced injection timing. Thus, the first fuel injection timing and the second fuel injection timing may be more delayed as the EGR flow rate increases. As such, the substitution ratio may be decreased in addition to adjusting the injection timing if modifying the injection time alone does not mitigate knock. The method returns to step 416 to confirm if knock is detected at the remaining cylinders. A timeline showing example adjustments to engine settings and resulting changes to AFR and substitution ratio are shown in FIG. 5.

If knock is not detected at the cylinders, the method proceeds to step 420 to determine if a maximum allowable AFR at each of the cylinders is attained. For example, the maximum allowable AFR for each cylinder may be dependent on a maximum pressure and temperature tolerance of the cylinder. As another example, the maximum allowable AFR may correspond to a maximum amount of charged air that can be delivered to the engine at the current operating point by varying the parameters affecting the AFR. For example, the maximum amount of delivered charged air may be achieved when engine speed and turbocharger speed are at maximum speed settings, injection timing is adjusted to allow a maximum increase in AFR enabled by the injection timing, manifold air temperature is at an optimal temperature for maximizing the AFR without causing knock and the waste gate is closed.

If the maximum allowable AFR is not achieved at one or more of the cylinders, the method returns to step 414 to continue increasing the AFR and maximizing the substitution ratio. If the maximum allowable AFR is achieved at all of the cylinders, the method continues to step 422 to maintain the engine settings with the substitution ratios maximized at each of the cylinders without incurring knock. As such, each cylinder may be individually optimized to combust the hydrogen/diesel mixture at a maximum substitution ratio while allowing engine power demands to be met. Emissions may be maintained low, e.g., below the emissions threshold, by enabling a greater proportion of a total fuel energy content of fuel injected at the engine to be provided by hydrogen.

Method 400 may be repeated for individual cylinders of the engine, for groups of cylinders (e.g., cylinders in dual fuel mode), or for all cylinders of the engine. For example, different cylinders of the engine may have different conditions, such as cylinder temperature. In this embodiment, method 400 may be individually applied to each cylinder of the engine to adjust a substitution ratio for each cylinder such that emissions may be reduced for the engine.

Turning now to FIG. 5, it shows a graph 500 illustrating one or more adjustments to engine operating conditions to adjust the AFR. Settings for turbo speed, waste gate position, EGR, and injection timing as shown in FIG. 5 are determined using the method described in FIG. 4 to maximize a substitution ratio while maintaining an emissions level below a desired emissions threshold, as described above.

Plot 510 illustrates a substitution ratio and dashed line 512 illustrates a desired (e.g., a determined) substitution ratio. Plot 520 illustrates an amount of a second fuel (diesel) delivered to the engine. Plot 530 illustrates an amount of a first fuel (hydrogen) delivered to the engine. Plot 540 illustrates an air-to-fuel ratio (AFR) of the engine and a maximum AFR is indicated by dashed line 545. An engine AFR may be stoichiometric, becoming more lean upwards from stoichiometry along the ordinate, or becoming more rich downwards from stoichiometry along the ordinate. Operation of the engine as described herein may demand predominantly lean conditions, therefore, the AFR remains above stoichiometry in the plot 540. Plot 550 illustrates a turbo (e.g., turbocharger) speed and dashed line 555 illustrates a maximum turbo speed. Plot 560 illustrates a waste gate position, which continuously varies between closed and open along the ordinate. Plot 570 illustrates EGR flow rate. Plot 580 illustrates injection timing, which varies among early, nominal, and late timing along the ordinate. Plot 590 illustrates engine knock sensor output, where the knock sensor output may be a voltage signal. Dashed line 595 indicates a knock threshold which, when the knock sensor output is equal to or greater than dashed line 595, engine knock occurs. Time increases along an abscissa from a left to right side of the figure. Values for plots 510, 520, 530, 550, and 570 may increase along the ordinates.

Prior to t1, the substitution ratio is relatively low and equal to a desired substitution ratio. The relatively low substitution ratio results in a high amount of the second fuel (e.g., diesel) and a low amount of the first fuel (e.g., hydrogen) provided to the engine. In one embodiment, the relatively low substitution ratio may correspond to a single fuel operation, where the second fuel is provided to the engine and the first fuel is not provided to the engine. The AFR is approximately equal to stoichiometric, which may be desired for combustion of diesel alone. The waste gate is partially open (e.g., 50% open), EGR is low, turbo speed is low, and fuel injection timing may be nominal. Amplitude of the knock sensor output is low, indicating the absence of engine knock.

At t1, the selected substitution ratio increases. In one embodiment, an engine operating condition may change from a first condition, where only the second fuel is desired, to a second condition, where both the first and second fuels are desired. Thus, the engine may change from a single fuel combustion mode to a dual fuel mode. The substitution ratio may increase to a new desired substitution ratio, for example, as determined at step 408 of the method for the given atmospheric pressure and temperature. As a result, between t1 and t2, the amount of second fuel decreases and the amount of first fuel increases.

As the engine has switched from the single fuel combustion mode to the dual fuel mode, a likelihood of engine knock due to auto-ignition of hydrogen may increase. As engine knock may degrade the engine over time, a method is desired for decreasing a likelihood of engine knock and decreasing emissions. In one example, this may be done by actively adjusting the AFR of the engine, as described in the method.

The AFR may be actively adjusted between t1 and t2 by adjusting engine settings. Engine settings for turbo speed, waste gate position, EGR flow, and injection timing may be determined using an engine calibration mapping method, as described above, a look up table, or other method for determining engine settings. For example, engine settings may be determined based on ambient temperature and pressure, the desired substitution ratio, and engine operating conditions.

Turbo speed may increase to equal maximum turbo speed between t1 and t2. For example, as the waste gate is closed from 50% open to 10% open, an increased exhaust gas amount may flow through the turbine, which may increase compressor speed and turbo speed. At t2, where turbo speed is equal to maximum turbo speed, adjustment of the waste gate may end. The waste gate may be partially open, for example, 10% open. AFR may be equal to the maximum AFR at t2, however a likelihood of engine knock may continue approaching a knock threshold.

Prior to t1, a likelihood of engine knock may approach the knock threshold and, at t2, engine knock may occur. An amount of charged air may be increased as the knock threshold is approached. It may thus be determined that currently implemented engine settings, including the substitution ratio, may not be sufficient to reduce likelihood of knock. Between t2 and t3, the substitution ratio may decrease to be less than the previously desired substitution ratio and greater than the substitution ratio prior to t1. Adjusting the substitution ratio may assist in reducing likelihood of engine knock. Additional adjustments may be made to EGR flow and injection timing between t3 and t4 to maintain emissions below the emissions threshold as the substitution ratio is increased.

At t4, engine knock may be mitigated. Current engine settings may therefore be maintained for a remaining duration of the engine dual fuel mode. If, during dual fuel mode operation, engine knock occurs, engine settings may be further adjusted to reduce likelihood of engine knock, as previously described. Engine settings may return to nominal settings upon indication the engine is in single fuel combustion mode.

The AFR may be actively adjusted during a dual fuel mode of a multi-fuel engine. Active adjustment of the AFR and optionally, adjustment of a substitution ratio, may reduce a likelihood of engine knock and reduce emissions by mitigating flame speed and auto ignition characteristics of hydrogen in the fuel mixture. In some cases, increasing the air-to-fuel ratio (AFR) may reduce the combustibility of the fuel mixture (e.g., the first fuel and the second fuel independently injected and independently mix with air and each other within the cylinder) and lessen the likelihood and severity of auto ignition.

A technical effect of actively adjusting the AFR and, optionally, the substitution ratio using engine settings based on engine operating condition and ambient conditions is a reduced likelihood of engine knock and unstable combustion, which may reduce degradation of the engine.

As used herein, an element or step recited in the singular and preceded with the word "a" or "an" do not exclude plural of said elements or steps, unless such exclusion is indicated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

As used herein, the term "approximately" is means plus or minus five percent of a given value or range unless otherwise indicated.

The disclosure also provides support for a method for an engine, comprising: mixing a first amount of a first fuel and a second amount of a second fuel to combust a fuel mixture having a fuel ratio of the first fuel relative to the second fuel, the first fuel having a faster combustion flame speed relative to the second fuel, the fuel mixture having an air-to-fuel ratio with a third amount of air delivered to the engine, and controlling either or both of a speed of combustion and a stability of combustion of a combustion mixture comprised of the fuel mixture and air delivered to the engine by changing at least one of the fuel ratio, the air-to-fuel ratio, or both of the fuel ratio and the air-to-fuel ratio. In a first example of the method, the method further comprises: controlling the air-to-fuel ratio, wherein the controlling comprises signaling a turbocharger to adjust an air output level of the turbocharger based at least in part on achieving a desired amount of air in the combustion mixture relative to the amount of the fuel mixture. In a second example of the method, optionally including the first example, signaling the turbocharger includes increasing a charged air amount, a quantity by which to increase the charged air amount selected based at least in part on one or more of engine settings such that, when engine settings are implemented, the air-to-fuel ratio is increased, resulting emissions are less than corresponding an emissions threshold, a likelihood of engine knock is decreased, and the fuel ratio is maximized. In a third example of the method, optionally including one or both of the first and second examples, the method further comprises: controlling an engine setting by adjusting one or more of a level of exhaust gas recirculation, an injection timing, a turbocharger setting, and a waste gate position. In a fourth example of the method, optionally including one or more or each of the first through third examples, the method further comprises: determining desired engine settings based at least in part on one or more of an engine reading relating to at least one of a barometric pressure, an ambient temperature, a humidity, an engine speed, a level of engine power, a manifold air temperature, and a manifold air pressure. In a fifth example of the method, optionally including one or more or each of the first through fourth examples, the method further comprises: adjusting engine operation at least partially in response to a measurement that the ambient temperature is above a determined threshold value and engine power is greater than a power threshold. In a sixth example of the method, optionally including one or more or each of the first through fifth examples, the method further comprises: adding an amount of exhaust gas recirculation to the combustion mixture to decrease a combustion rate of the combustion mixture. In a seventh example of the method, optionally including one or more or each of the first through sixth examples, the amount of the first fuel is increased in response to an increase in the air-to-fuel ratio. In an eighth example of the method, optionally including one or more or each of the first through seventh examples, the first fuel is hydrogen and the second fuel is diesel.

The disclosure also provides support for a method for a multi-fuel engine, comprising: switching the multi-fuel engine from a first single fuel combustion mode, in which a liquid fuel is combusted at a first air-to-fuel ratio, to a second multi-fuel combustion mode, in which a mixture of hydrogen and the liquid fuel are combusted at a second air-to-fuel ratio, the second air-to-fuel ratio being higher than the first air-to-fuel ratio. In a first example of the method, the method further comprises: adjusting a ratio of hydrogen to liquid fuel in the mixture up to a determined knock threshold of the multi-fuel engine. In a second example of the method, optionally including the first example, the determined knock threshold is based on a pressure rise rate or maximum cylinder pressure. In a third example of the method, optionally including one or both of the first and second examples, an amount of hydrogen is reduced as the determined knock threshold is approached. In a fourth example of the method, optionally including one or more or each of the first through third examples, an amount of charged air is increased as the determined knock threshold is approached. In a fifth example of the method, optionally including one or more or each of the first through fourth examples, the amount of charged air is controlled by adjusting at least one of exhaust gas recirculation, injection timing, a variable geometry turbocharger setting, operation of an electrical turbocharger, a valve timing of the multi-fuel engine, and waste gate position. In a sixth example of the method, optionally including one or more or each of the first through fifth examples, a combustion rate of the mixture of hydrogen and the liquid fuel is reduced by adjusting an amount of exhaust gas recirculation combined with the amount of charged air, thus adjusting an oxidant content available for combustion. In a seventh example of the method, optionally including one or more or each of the first through sixth examples, the multi-fuel engine operates using homogeneous charge compression ignition (HCCI) when a first air-to-fuel ratio is greater than a first air-to-fuel threshold and a first substitution ratio is greater than a first substitution threshold, and the multi-fuel engine operates using premixed charge compression ignition (PCCI) when a second air-to-fuel ratio is less than a second air-to-fuel threshold and a second substitution ratio is less than a second substitution threshold. In an eighth example of the method, optionally including one or more or each of the first through seventh examples, the method further comprises: determining a desired engine setting based at least in part on one or more of an engine reading relating to at least one of barometric pressure, ambient temperature, humidity, engine speed, engine power, manifold air temperature, and manifold air pressure. In a ninth example of the method, optionally including one or more or each of the first through eighth examples, the method further comprises: adjusting engine settings to increase the air-to-fuel ratio in response to a measurement that the ambient temperature is above a determined threshold value and engine power is relatively high.

The disclosure also provides support for a system comprising a controller having one or more processors configured to cause an engine to adjust a first amount of a first fuel relative to a second amount of a second fuel in response to an increase in an air-to-fuel ratio.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system may take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

This written description uses examples to disclose the invention, including the best mode, and also to enable a person of ordinary skill in the relevant art to practice the invention, including making and using devices or systems and performing the incorporated methods. The patentable scope of the invention is defined by the claims, and may include other embodiments that occur to those of ordinary skill in the art. Such other embodiments are intended to be within the scope of the claims if they have structural elements that do not differ from the literal language of the claims, or if they include equivalent structural elements with insubstantial differences from the literal languages of the claims.

The invention claimed is:

1. A method for an engine, comprising:
   increasing a fuel ratio of a first fuel and a second fuel in response to a speed of a turbocharger increasing;
   mixing a first amount of the first fuel and a second amount of the second fuel to combust a fuel mixture having the fuel ratio of the first fuel relative to the second fuel, the first fuel having a faster combustion flame speed relative to the second fuel, the fuel mixture having an air-to-fuel ratio with a third amount of air delivered to the engine; and
   controlling either or both of a speed of combustion and a stability of combustion of a combustion mixture comprised of the fuel mixture and air delivered to the engine by changing at least one of the fuel ratio, the air-to-fuel ratio, or both of the fuel ratio and the air-to-fuel ratio.

2. The method of claim 1, further comprising controlling the air-to-fuel ratio, wherein the controlling comprises signaling the turbocharger to adjust an air output level of the turbocharger based at least in part on achieving a desired amount of air in the combustion mixture relative to the amount of the fuel mixture.

3. The method of claim 2, wherein signaling the turbocharger includes increasing a charged air amount, a quantity by which to increase the charged air amount selected based at least in part on one or more of engine settings such that, when engine settings are implemented, the air-to-fuel ratio is increased, resulting emissions are less than corresponding an emissions threshold, a likelihood of engine knock is decreased, and the fuel ratio is maximized.

4. The method of claim 1, further comprising controlling an engine setting by adjusting one or more of a level of exhaust gas recirculation, an injection timing, a turbocharger setting, and a waste gate position.

5. The method of claim 4, further comprising determining desired engine settings based at least in part on one or more of an engine reading relating to at least one of a barometric pressure, an ambient temperature, a humidity, an engine speed, a level of engine power, a manifold air temperature, and a manifold air pressure.

6. The method of claim 5, further comprising adjusting engine operation at least partially in response to a measurement that the ambient temperature is above a determined threshold value and engine power is greater than a power threshold.

7. The method of claim 4, further comprising adding an amount of exhaust gas recirculation to the combustion mixture to decrease a combustion rate of the combustion mixture.

8. The method of claim 1, wherein the amount of the first fuel is increased in response to an increase in the air-to-fuel ratio.

9. The method of claim 1, wherein the first fuel is hydrogen and the second fuel is diesel.

10. A method for a multi-fuel engine, comprising:
switching the multi-fuel engine from a first single fuel combustion mode, in which a liquid fuel is combusted at a first air-to-fuel ratio, to a second multi-fuel combustion mode in response to a turbocharger speed increasing, in which a mixture of hydrogen and the liquid fuel are combusted at a second air-to-fuel ratio, the second air-to-fuel ratio being higher than the first air-to-fuel ratio.

11. The method of claim 10, further comprising adjusting a ratio of hydrogen to liquid fuel in the mixture up to a determined knock threshold of the multi-fuel engine.

12. The method of claim 11, wherein the determined knock threshold is based on a pressure rise rate or maximum cylinder pressure.

13. The method of claim 11, wherein an amount of hydrogen is reduced as the determined knock threshold is approached.

14. The method of claim 11, wherein an amount of charged air is increased as the determined knock threshold is approached.

15. The method of claim 14, wherein the amount of charged air is controlled by adjusting at least one of exhaust gas recirculation, injection timing, a variable geometry turbocharger setting, operation of an electrical turbocharger, a valve timing of the multi-fuel engine, and waste gate position.

16. The method of claim 10, wherein a combustion rate of the mixture of hydrogen and the liquid fuel is reduced by adjusting an amount of exhaust gas recirculation combined with the amount of charged air, thus adjusting an oxidant content available for combustion.

17. The method of claim 10, wherein the multi-fuel engine operates using homogeneous charge compression ignition (HCCI) when a first air-to-fuel ratio is greater than a first air-to-fuel threshold and a first substitution ratio is greater than a first substitution threshold, and the multi-fuel engine operates using premixed charge compression ignition (PCCI) when a second air-to-fuel ratio is less than a second air-to-fuel threshold and a second substitution ratio is less than a second substitution threshold.

18. The method of claim 10, further comprising determining a desired engine setting based at least in part on one or more of an engine reading relating to at least one of barometric pressure, ambient temperature, humidity, engine speed, engine power, manifold air temperature, and manifold air pressure.

19. The method of claim 18, further comprising adjusting engine settings to increase the air-to-fuel ratio in response to a measurement that the ambient temperature is above a determined threshold value and engine power is relatively high.

20. A system comprising a controller having one or more processors configured to cause an engine to:
switch from single fuel combustion mode to a multi-fuel combustion mode in response to a turbocharger speed increasing; and
adjust a first amount of a first fuel relative to a second amount of a second fuel in response to an increase in an air-to-fuel ratio.

* * * * *